(12) United States Patent
Lee et al.

(10) Patent No.: US 9,131,237 B2
(45) Date of Patent: *Sep. 8, 2015

(54) METHOD AND APPARATUS FOR ENCODING AND DECODING MOTION VECTOR BY PREDICTING MOTION VECTOR ACCORDING TO MODE

(71) Applicant: SAMSUNG ELECTRONICS CO., LTD., Suwon-si (KR)

(72) Inventors: Tammy Lee, Seoul (KR); Woo-jin Han, Suwon-si (KR); Jung-hye Min, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/515,226

(22) Filed: Oct. 15, 2014

(65) Prior Publication Data

US 2015/0049816 A1    Feb. 19, 2015

Related U.S. Application Data

(63) Continuation of application No. 13/006,657, filed on Jan. 14, 2011, now Pat. No. 8,995,529.

(30) Foreign Application Priority Data

Jan. 14, 2010    (KR) .................. 10-2010-0003554

(51) Int. Cl.
*H04N 7/12* (2006.01)
*H04N 19/33* (2014.01)
(Continued)

(52) U.S. Cl.
CPC .......... *H04N 19/33* (2014.11); *H04N 19/00436* (2013.01); *H04N 19/103* (2014.11);
(Continued)

(58) Field of Classification Search
CPC .......... H04N 19/00436; H04N 19/103; H04N 19/105; H04N 19/139; H04N 19/147; H04N 19/176; H04N 19/33; H04N 19/44; H04N 19/51; H04N 19/513; H04N 19/52; H04N 19/70; H04N 19/96
USPC ...................................... 375/240.12
See application file for complete search history.

(56) References Cited

U.S. PATENT DOCUMENTS 6,097,842 A    8/2000    Suzuki et al.
7,444,026 B2   10/2008   Fujimoto
(Continued)

FOREIGN PATENT DOCUMENTS

CN    101415122 A    4/2009
EP    1784985        2/2006
(Continued)

OTHER PUBLICATIONS

International Search Report [PCT/ISA/210], dated Sep. 9, 2011, issued in Application No. PCT/KR2011/000301.
(Continued)

*Primary Examiner* — Jessica M Prince
(74) *Attorney, Agent, or Firm* — Sughrue Mion, PLLC

(57) ABSTRACT

Provided are methods and apparatuses for encoding and decoding a motion vector. The method of encoding a motion vector includes: selecting a mode from among a first mode in which information indicating a motion vector predictor of at least one motion vector predictor is encoded and a second mode in which information indicating generation of a motion vector predictor based on pixels included in a previously encoded area adjacent to a current block is encoded; determining a motion vector predictor of the current block according to the selected mode and encoding information about the motion vector predictor of the current block; and encoding a difference vector between a motion vector of the current block and the motion vector predictor of the current block.

1 Claim, 17 Drawing Sheets

(51) Int. Cl.

| | | |
|---|---|---|
| *H04N 19/105* | (2014.01) | |
| *H04N 19/52* | (2014.01) | |
| *H04N 19/139* | (2014.01) | |
| *H04N 19/176* | (2014.01) | |
| *H04N 19/70* | (2014.01) | |
| *H04N 19/147* | (2014.01) | |
| *H04N 19/51* | (2014.01) | |
| *H04N 19/513* | (2014.01) | |
| *H04N 19/96* | (2014.01) | |
| *H04N 19/103* | (2014.01) | |
| *H04N 19/44* | (2014.01) | |

(52) U.S. Cl.
CPC ........... *H04N19/105* (2014.11); *H04N 19/139* (2014.11); *H04N 19/147* (2014.11); *H04N 19/176* (2014.11); *H04N 19/44* (2014.11); *H04N 19/51* (2014.11); *H04N 19/513* (2014.11); *H04N 19/52* (2014.11); *H04N 19/70* (2014.11); *H04N 19/96* (2014.11)

(56) References Cited

U.S. PATENT DOCUMENTS

| | | | |
|---|---|---|---|
| 7,643,556 B2 * | 1/2010 | Jeon ...................... | 375/240.16 |
| 7,809,063 B2 | 10/2010 | Lin | |
| 7,899,117 B2 | 3/2011 | Kawaharada | |
| 8,831,105 B2 | 9/2014 | Lee et al. | |
| 8,867,607 B2 | 10/2014 | Jeon et al. | |
| 8,867,621 B2 | 10/2014 | Lee et al. | |
| 2004/0136461 A1 | 7/2004 | Kondo et al. | |
| 2004/0218674 A1 * | 11/2004 | Kondo et al. ............ | 375/240.16 |
| 2005/0265455 A1 | 12/2005 | Kawaharada | |
| 2006/0039472 A1 | 2/2006 | Barbarien et al. | |
| 2006/0120612 A1 | 6/2006 | Manjunath et al. | |
| 2006/0280253 A1 | 12/2006 | Tourapis et al. | |
| 2007/0047648 A1 | 3/2007 | Tourapis et al. | |
| 2007/0110160 A1 | 5/2007 | Wang et al. | |
| 2007/0247549 A1 | 10/2007 | Jeong et al. | |
| 2008/0063075 A1 | 3/2008 | Kondo et al. | |
| 2008/0159401 A1 | 7/2008 | Lee et al. | |
| 2008/0181309 A1 * | 7/2008 | Lee et al. ................ | 375/240.16 |
| 2009/0232211 A1 | 9/2009 | Chen et al. | |
| 2009/0232217 A1 | 9/2009 | Lee et al. | |
| 2010/0220790 A1 | 9/2010 | Jeon et al. | |
| 2010/0278236 A1 | 11/2010 | Yang et al. | |
| 2011/0085593 A1 | 4/2011 | Wang et al. | |
| 2011/0228853 A1 | 9/2011 | Suzuki et al. | |
| 2011/0261882 A1 * | 10/2011 | Zheng et al. ............ | 375/240.13 |
| 2012/0213288 A1 | 8/2012 | Kitaura et al. | |
| 2013/0279578 A1 | 10/2013 | Moriya et al. | |
| 2014/0334550 A1 | 11/2014 | Lee et al. | |

FOREIGN PATENT DOCUMENTS

| | | |
|---|---|---|
| EP | 2202985 A1 | 6/2010 |
| JP | 10-178639 A | 6/1998 |
| JP | 11-146367 A | 5/1999 |
| JP | 2004-241880 A | 8/2004 |
| JP | 2005-510985 A | 4/2005 |
| JP | 2007-6399 A | 1/2007 |
| JP | 2013502141 A | 1/2013 |
| JP | 5620555 B2 | 11/2014 |
| KR | 10-2007-0090236 A | 9/2007 |
| KR | 10-0800772 B1 | 2/2008 |
| RU | 2189120 C2 | 4/2000 |
| RU | 2 182 727 C2 | 5/2002 |
| RU | 2 335 859 C2 | 10/2008 |
| RU | 2 360 375 C2 | 6/2009 |
| WO | 2006/012383 A2 | 2/2006 |
| WO | 2007034918 A1 | 3/2007 |
| WO | 2008027192 A2 | 3/2008 |
| WO | 2008082158 A1 | 7/2008 |
| WO | 2009/051419 A2 | 4/2009 |
| WO | 2011034148 A1 | 3/2011 |
| WO | 2011048903 A1 | 4/2011 |

OTHER PUBLICATIONS

Communication dated Oct. 1, 2013 issued by the Japanese Patent Office in counterpart Japanese Patent Application No. 2013-168578.
Joel Jung, et al; "Competition-Based Sceme for Motion Vector Selection and Coding Information"; ITU-Telecommunications Standardization Sector, Study Group 16 Question 6 Video Coding Experts Group (VCEG) 29th meeting; Jul. 13, 2006; 8 pgs.
Jaeil Kim, et al; "Enlarging MB size for high fidelity video coding beyond HD"; ITU-Telecommunications Standardization Sector, Study Group 16 Question 6, Video Coding Experts Group (VCEG), 36th Meeting; Oct. 5, 2008; 7 pgs.
Communication dated Oct. 15, 2013 issued by the Russian Patent Office in counterpart Russian Patent Application No. 2012134634.
Communication dated Oct. 17, 2013 issued by the Russian Patent Office in counterpart Russian Patent Application No. 2013113951.
Communication dated Feb. 13, 2014, issued by the Mexican Patent Office in counterpart application No. MX/a/2013/010800.
Communication dated Feb. 13, 2014, issued by the Mexican Patent Office in counterpart application No. MX/a/2013/010799.
Communication dated Feb. 13, 2014, issued by the Mexican Patent Office in counterpart application No. MX/a/2013/010802.
Communication dated Mar. 6, 2014, issued by the European Patent Office in counterpart application No. 11733108.2.
Communication dated Mar. 6, 2014, issued by the European Patent Office in counterpart application No. 13172421.3.
Yang, Jungyoup, "Motion Vector Coding with Optimal PMV Selection", ITU-Telecommunications Standardization Sector, Study Group 16 Question 6, Video Coding Experts Group, Jul. 18, 2008, pp. 1-6.
Wiegand, Thomas, "Overview of the H.264/AVC Video Coding Standard", IEEE Transactions on Circuits and Systems for Video Technology, vol. 13, No. 7, Jul. 2003, pp. 560-576.
Laroche, Guillaume, "RD Optimized Coding for Motion Vector Predictor Selection", IEEE Transactions on Circuits and Systems for Video Technology, vol. 18, No. 9, Sep. 2008, pp. 1247-1257.
Communication dated Jun. 2, 2014, issued by the Australian Patent Office in counterpart Australian Application No. 2013202014.
Communication dated Jun. 3, 2014, issued by the Australian Patent Office in counterpart Australian Application No. 2011205896.
Communication dated May 27, 2014, issued by the Russian Federal Service for Intellectual Property in counterpart Russian Application No. 2013158838.
Communication dated Jul. 21, 2014, issued by the Korean Intellectual Property Office in counterpart Korean Application No. 10-2013-0048515.
Communication dated Jul. 30, 2014, issued by the Canadian Intellectual Property Office in counterpart Canadian Application No. 2,787,006.
Communication dated Oct. 21, 2014, issued by the Japanes Intellectual Property Office in counterpart Japanese Application No. 2012-548896.
Communication dated Dec. 2, 2014, issued by the State Intellectual Property Office of P.R. China in counterpart Chinese Application No. 201180014025.1.
Kamp, S., et.al., "Fast Decoder Side Motion Vector Derivation for Inter Frame Video Coding", Proc. of the Picture Coding Symposium 2009 (pcs 2009), May 2009, p. 1-4, ISBN:978-1-4244-4593-6.

* cited by examiner

CODING UNIT

PREDICTION UNIT

PREDICTION UNIT

TRANSFORM UNIT

METHOD AND APPARATUS FOR ENCODING AND DECODING MOTION VECTOR BY PREDICTING MOTION VECTOR ACCORDING TO MODE

CROSS-REFERENCE TO RELATED PATENT APPLICATION

This is a continuation of U.S. application Ser. No. 13/006,657, filed Jan. 14, 2011, which claims priority from Korean Patent Application No. 10-2010-0003554, filed on Jan. 14, 2010 in the Korean Intellectual Property Office, the disclosure of which is incorporated herein in its entirety by reference.

BACKGROUND

1. Field

Apparatuses and methods consistent with exemplary embodiments relate to encoding and decoding a motion vector, and more particularly, to encoding and decoding a motion vector by predicting a motion vector of a current block.

2. Description of the Related Art

A codec, such as Moving Pictures Experts Group (MPEG)-4 H.264/MPEG-4 Advanced Video Coding (AVC), uses motion vectors of previously encoded blocks adjacent to a current block to predict a motion vector of the current block. That is, a median of motion vectors of previously encoded blocks adjacent to left, upper, and upper-right sides of a current block may be used as a motion vector predictor of the current block.

SUMMARY

One or more exemplary embodiments provide a method and apparatus for encoding and decoding a motion vector, and a computer readable recording medium having recorded thereon a computer program for executing the method.

According to an aspect of an exemplary embodiment, there is provided a method of encoding a motion vector, the method including: selecting, from among a first mode and a second mode, the first mode in which information indicating a motion vector predictor of at least one motion vector predictor is encoded or a second mode in which information indicating generation of a motion vector predictor based on pixels included in a previously encoded area adjacent to a current block is encoded; determining a motion vector predictor of the current block according to the selected mode and encoding information about the motion vector predictor of the current block; and encoding a difference vector between a motion vector of the current block and the motion vector predictor of the current block, wherein the second mode is a mode in which information indicating generation of the motion vector predictor by setting a range within which the motion vector predictor is to be searched based on the at least one motion vector predictor and by searching within the search range by using pixels included in the previously encoded area, is encoded.

The selecting the first mode or the second mode may include selecting the first mode or the second mode based on a depth indicating a degree of decreasing from a size of a maximum coding unit of a current picture or slice to a size of the current block.

The selecting the first mode or the second mode may include selecting the first mode or the second mode in a unit of a current picture or slice including the current block.

The selecting the first mode or the second mode may include selecting the first mode or the second mode based on whether the current block is encoded in a skip mode.

The at least one motion vector predictor may include a first motion vector of a block adjacent to a left side of the current block, a second motion vector of a block adjacent to an upper side of the current block, and a third motion vector of a block adjacent to an upper-right side of the current block.

The at least one motion vector predictor may further include a median value of the first motion vector, the second motion vector, and the third motion vector.

The at least one motion vector predictor may further include a motion vector predictor generated based on a motion vector of a block co-located with the current block in a reference picture and a temporal distance between the reference picture and a current picture.

The encoding the information about the motion vector predictor of the current block may include encoding information indicating whether the block co-located with the current block is a block of a picture temporally preceding the current picture or a block of a picture temporally following the current picture.

Information indicating whether the block co-located with the current block is the block of the picture temporally preceding the current picture or the block of the picture temporally following the current picture may be inserted into a header of a slice in which the current block is included.

According to an aspect of another exemplary embodiment, there is provided an apparatus for encoding a motion vector, the apparatus including: a prediction unit which selects, from among a first mode and a second mode, the first mode in which information indicating one of at least one motion vector predictor is encoded or the second mode in which information indicating generation of a motion vector predictor based on pixels included in a previously encoded area adjacent to a current block is encoded; a first encoder which determines a motion vector predictor of the current block according to the selected mode and encodes information about the motion vector predictor of the current block; and a second encoder which encodes a difference vector between a motion vector of the current block and the motion vector predictor of the current block, wherein the second mode is a mode in which information indicating generation of the motion vector predictor by setting a range within which the motion vector predictor is to be searched based on the at least one motion vector predictor and by searching within the search range by using pixels included in the previously encoded area, is encoded.

According to an aspect of another exemplary embodiment, there is provided a method of decoding a motion vector, the method including: decoding information about a motion vector predictor of a current block encoded according to a mode selected from among a first mode and a second mode; decoding a difference vector between a motion vector of the current block and the motion vector predictor of the current block; generating the motion vector predictor of the current block based on the decoded information about the motion vector predictor of the current block; and restoring the motion vector of the current block based on the generated motion vector predictor and the decoded difference vector, wherein the first mode is a mode in which information indicating one of at least one motion vector predictor is encoded and the second mode is a mode in which information indicating generation of the motion vector predictor by setting a range within which the motion vector predictor is to be searched based on the at least one motion vector predictor and by searching within the search range by using pixels included in a previously encoded area adjacent to the current block, is encoded.

According to an aspect of another exemplary embodiment, there is provided an apparatus for decoding a motion vector, the apparatus including: a first decoder which decodes information about a motion vector predictor of a current block encoded according to a mode selected from among a first mode and a second mode; a second decoder which decodes a difference vector between a motion vector of the current block and the motion vector predictor of the current block; a prediction unit which generates the motion vector predictor of the current block based on the decoded information about the motion vector predictor of the current block; and a motion vector restorer which restores the motion vector of the current block based on the generated motion vector predictor and the decoded difference vector, wherein the first mode is a mode in which information indicating one of at least one motion vector predictor is encoded and the second mode is a mode in which information indicating generation of the motion vector predictor by setting a range within which the motion vector predictor is to be searched based on the at least one motion vector predictor and by searching within the search range by using pixels included in a previously encoded area adjacent to the current block, is encoded.

According to an aspect of another exemplary embodiment, there is provided a computer readable recording medium having recorded thereon a computer program for executing the method of encoding a motion vector and the method of decoding a motion vector.

According to an aspect of another exemplary embodiment, there is provided a method of encoding a motion vector, the method including: selecting, from among a first mode and a second mode, the first mode in which information indicating a motion vector predictor of at least one motion vector predictor is encoded or the second mode in which information indicating generation of a motion vector predictor based on pixels included in a previously encoded area adjacent to a current block is encoded; determining a motion vector predictor of the current block according to the selected mode and encoding information about the motion vector predictor of the current block; and encoding a difference vector between a motion vector of the current block and the motion vector predictor of the current block.

BRIEF DESCRIPTION OF THE DRAWINGS

The above and other aspects will become more apparent by describing in detail exemplary embodiments with reference to the attached drawings in which.

DETAILED DESCRIPTION OF EXEMPLARY EMBODIMENTS

Figure 1:
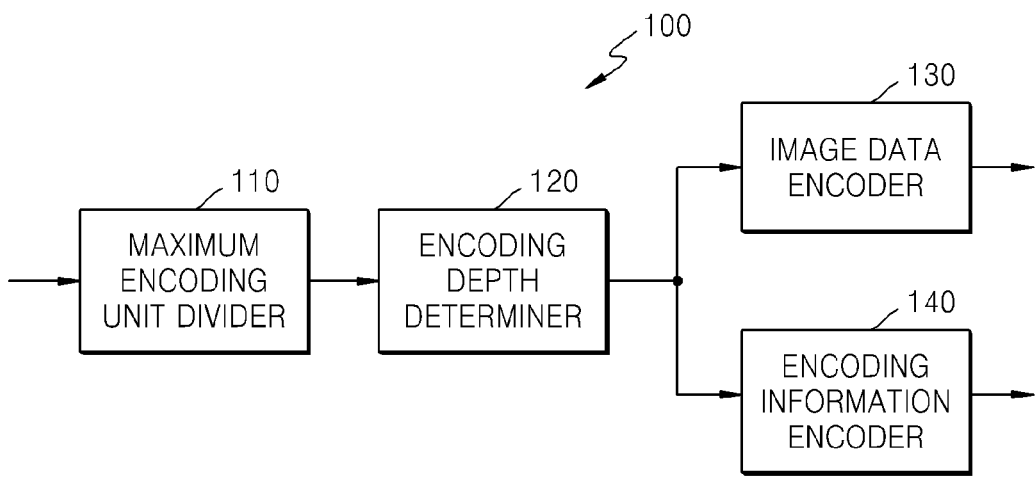
FIG. 1 is a block diagram of an apparatus for encoding an image, according to an exemplary embodiment.

Certain exemplary embodiments are described in greater detail below with reference to the accompanying drawings. Expressions such as "at least one of," when preceding a list of elements, modify the entire list of elements and do not modify the individual elements of the list. In the present specification, an "image" may denote a still image for a video or a moving image, that is, the video itself.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters.

FIG. 1 is a block diagram of an image encoding apparatus 100 for encoding an image, according to an exemplary embodiment. The image encoding apparatus 100 may be implemented as a hardware apparatus such as, for example, a processor of a computer or a computer system. The image encoding apparatus 100, or one or more components thereof, may also be implemented as a software module residing on the computer system.

Referring to FIG. 1, the image encoding apparatus 100 includes a maximum encoding unit divider 110, an encoding depth determiner 120, an image data encoder 130, and an encoding information encoder 140 which may be implemented, for example, as hardware or software modules integrated within the image encoding apparatus 100 or separately from the image encoding apparatus 100.

The maximum encoding unit divider 110 may divide a current frame or slice based on a maximum coding unit that is a coding unit of the largest size. That is, the maximum encoding unit divider 110 may divide the current frame or slice into at least one maximum coding unit.

According to an exemplary embodiment, a coding unit may be represented using a maximum coding unit and a depth. As described above, the maximum coding unit indicates a coding unit having the largest size from among coding units of the current frame, and the depth indicates a degree of hierarchically decreasing the coding unit. As a depth increases, a coding unit may decrease from a maximum coding unit to a minimum coding unit, wherein a depth of the maximum coding unit is defined as a minimum depth and a depth of the minimum coding unit is defined as a maximum depth. Since the size of a coding unit decreases from a maximum coding unit as a depth increases, a sub coding unit of a kth depth may include a plurality of sub coding units of a (k+n)th depth (where k and n are integers equal to or greater than 1).

According to an increase of the size of a frame to be encoded, encoding an image in a greater coding unit may cause a higher image compression ratio. However, if a greater coding unit is fixed, an image may not be efficiently encoded by reflecting continuously changing image characteristics.

For example, when a smooth area such as the sea or sky is encoded, the greater a coding unit is, the more a compression ratio may increase. However, when a complex area such as people or buildings is encoded, the smaller a coding unit is, the more a compression ratio may increase.

Accordingly, in an exemplary embodiment, a different maximum image coding unit and a different maximum depth are set for each frame or slice. Since a maximum depth denotes the maximum number of times by which a coding unit may decrease, the size of each minimum coding unit included in a maximum image coding unit may be variably set according to a maximum depth. The maximum depth may be determined differently for each frame or slice or for each maximum coding unit.

The encoding depth determiner 120 determines a division shape of the maximum coding unit. The division shape may be determined based on calculation of rate-distortion (RD) costs. The determined division shape of the maximum coding unit is provided to the encoding information encoder 140, and image data according to maximum coding units is provided to the image data encoder 130.

A maximum coding unit may be divided into sub coding units having different sizes according to different depths, and the sub coding units having different sizes, which are included in the maximum coding unit, may be predicted or frequency-transformed based on processing units having different sizes. In other words, the image encoding apparatus 100 may perform a plurality of processing operations for image encoding based on processing units having various sizes and various shapes. To encode image data, processing operations such as prediction, transform, and entropy encoding are performed, wherein processing units having the same size or different sizes may be used for every operation.

For example, the image encoding apparatus 100 may select a processing unit that is different from a coding unit to predict the coding unit.

When the size of a coding unit is 2N×2N (where N is a positive integer), processing units for prediction may be 2N×2N, 2N×N, N×2N, and N×N. In other words, motion prediction may be performed based on a processing unit having a shape whereby at least one of a height and a width of a coding unit is equally divided by two. Hereinafter, a processing unit, which is the base of prediction, is defined as a prediction unit.

A prediction mode may be at least one of an intra mode, an inter mode, and a skip mode, and a specific prediction mode may be performed for only a prediction unit having a specific size or a specific shape. For example, the intra mode may be performed for only prediction units having the sizes of 2N×2N and N×N which have the shape of a square. Further, the skip mode may be performed for only a prediction unit having the size of 2N×2N. If a plurality of prediction units exists in a coding unit, the prediction mode with the least encoding errors may be selected after performing prediction for every prediction unit.

Alternatively, the image encoding apparatus 100 may perform frequency transform on image data based on a processing unit having a different size from a coding unit. For the frequency transform in the coding unit, the frequency transform may be performed based on a processing unit having a size equal to or smaller than that of the coding unit. Hereinafter, a processing unit, which is the base of frequency transform, is defined as a transform unit. The frequency transform may be discrete cosine transform (DCT) or Karhunen-Loeve transform (KLT).

The encoding depth determiner 120 may determine sub coding units included in a maximum coding unit using RD optimization based on a Lagrangian multiplier. In other words, the encoding depth determiner 120 may determine which shape a plurality of sub coding units divided from the maximum coding unit has, wherein the plurality of sub coding units has different sizes according to the depths of sub coding units. The image data encoder 130 outputs a bitstream by encoding the maximum coding unit based on the division shapes determined by the encoding depth determiner 120.

The encoding information encoder 140 encodes information about an encoding mode of the maximum coding unit determined by the encoding depth determiner 120. In other words, the encoding information encoder 140 outputs a bitstream by encoding information about a division shape of the maximum coding unit, information about the maximum depth, and information about an encoding mode of a sub coding unit for each depth. The information about the encoding mode of the sub coding unit may include information about a prediction unit of the sub coding unit, information about a prediction mode for each prediction unit, and information about a transform unit of the sub coding unit.

The information about the division shape of the maximum coding unit may be flag information, indicating whether each coding unit is divided. For example, when the maximum coding unit is divided and encoded, information indicating whether the maximum coding unit is divided is encoded. Also, when a sub coding unit divided from the maximum coding unit is divided and encoded, information indicating whether the sub coding unit is divided is encoded.

Since sub coding units having different sizes exist for each maximum coding unit and information about an encoding mode is determined for each sub coding unit, information about at least one encoding mode may be determined for one maximum coding unit.

The image encoding apparatus 100 may generate sub coding units by equally dividing the height and width of a maximum coding unit by two according to an increase of depth. That is, when the size of a coding unit of a kth depth is 2N×2N, the size of a coding unit of a (k+1)th depth is N×N.

Accordingly, the image encoding apparatus 100 may determine an optimal division shape for each maximum coding unit based on sizes of maximum coding units and a maximum depth in consideration of image characteristics. By variably adjusting the size of a maximum coding unit in consideration of image characteristics and encoding an image through division of a maximum coding unit into sub coding units of different depths, images having various resolutions may be more efficiently encoded.

Figure 2:
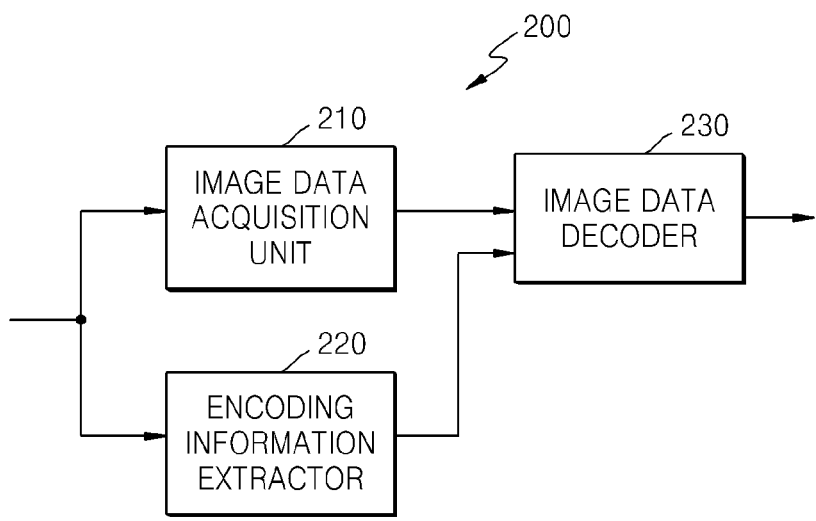
FIG. 2 is a block diagram of an apparatus for decoding an image, according to an exemplary embodiment.

FIG. 2 is a block diagram of an image decoding apparatus 200 for decoding an image according to an exemplary embodiment. The image decoding apparatus 200 may be implemented as a hardware apparatus such as, for example, a processor of a computer, or a computer system. The image decoding apparatus 200, or one or more components thereof, may also be implemented as a software module residing on the computer system.

Referring to FIG. 2, the image decoding apparatus 200 includes an image data acquisition unit 210, an encoding information extractor 220, and an image data decoder 230 which may be implemented, for example, as hardware or software modules integrated within the image decoding apparatus 200 or separately from the image encoding apparatus 200.

The image data acquisition unit 210 acquires image data according to maximum coding units by parsing a bitstream received by the image decoding apparatus 200 and outputs the image data to the image data decoder 230. The image data acquisition unit 210 may extract information about a maximum coding unit of a current frame or slice from a header of the current frame or slice. In other words, the image data acquisition unit 210 divides the bitstream in the maximum coding unit so that the image data decoder 230 may decode the image data according to maximum coding units.

The encoding information extractor 220 extracts information about a maximum coding unit, a maximum depth, a division shape of the maximum coding unit, and an encoding mode of sub coding units from the header of the current frame by parsing the bitstream received by the image decoding apparatus 200. The information about a division shape and the information about an encoding mode are provided to the image data decoder 230.

The information about a division shape of the maximum coding unit may include information about sub coding units having different sizes according to depths and included in the maximum coding unit, and may be flag information indicating whether each coding unit is divided.

The information about an encoding mode may include information about a prediction unit according to sub coding units, information about a prediction mode, and information about a transform unit.

The image data decoder 230 restores the current frame by decoding image data of every maximum coding unit based on the information extracted by the encoding information extractor 220.

The image data decoder 230 may decode sub coding units included in a maximum coding unit based on the information about a division shape of the maximum coding unit. A decoding process may include a prediction process including intra prediction and motion compensation and an inverse transform process.

The image data decoder 230 may perform intra prediction or inter prediction based on information about a prediction unit and information about a prediction mode to predict a prediction unit. The image data decoder 230 may also perform inverse transform for each sub coding unit based on information about a transform unit of a sub coding unit.

Figure 3:
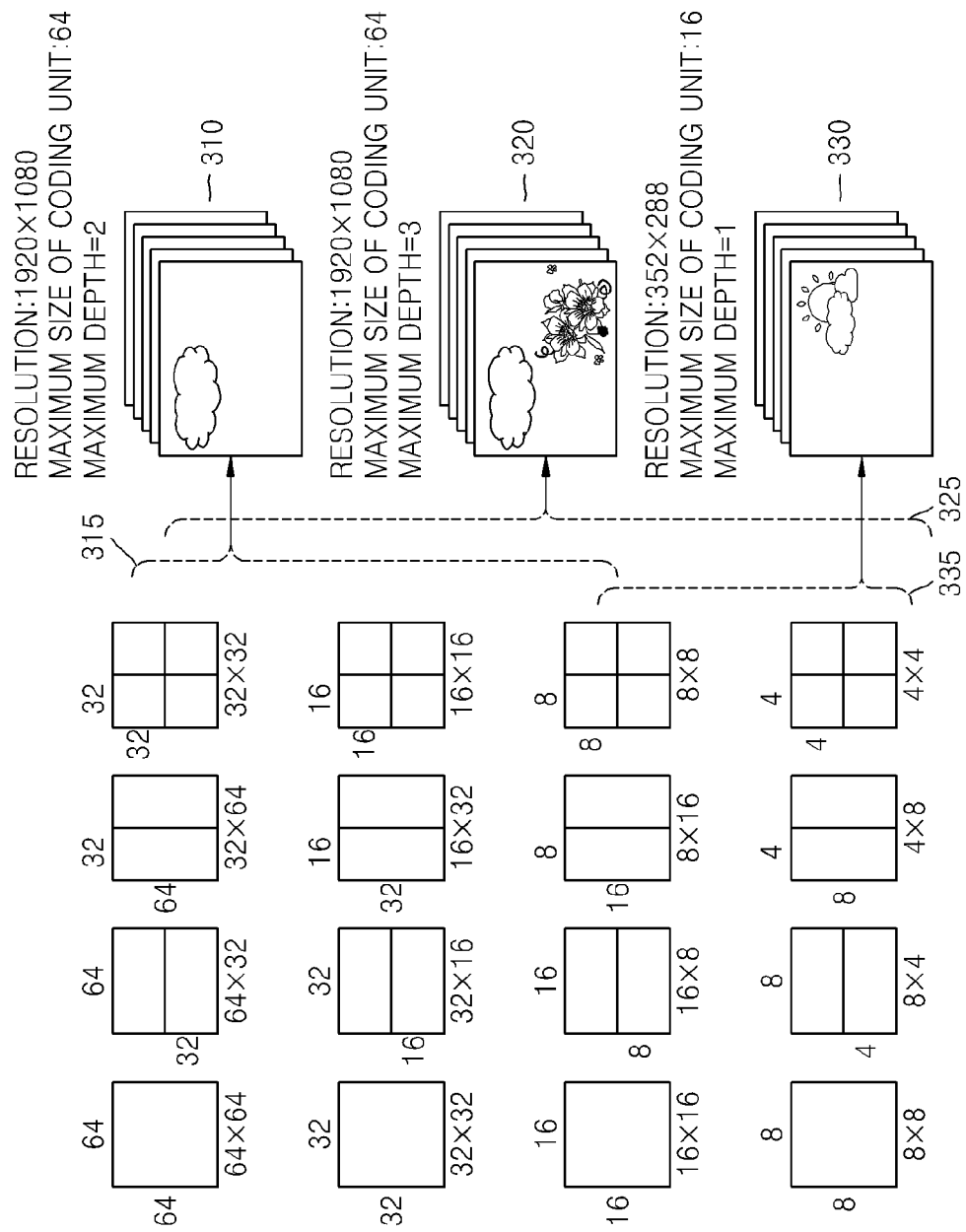
FIG. 3 illustrates hierarchical coding unit according to an exemplary embodiment.

FIG. 3 illustrates hierarchical coding units according to an exemplary embodiment.

Referring to FIG. 3, the hierarchical coding units may include coding units whose widths and heights are 64×64, 32×32, 16×16, 8×8, and 4×4. Besides these coding units having perfect square shapes, coding units whose widths and heights are 64×32, 32×64, 32×16, 16×32, 16×8, 8×16, 8×4, and 4×8 may also exist.

Referring to FIG. 3, for image data set 310 whose resolution is 1920×1080, the size of a maximum coding unit is set to 64×64, and a maximum depth is set to 2.

For image data set 320 whose resolution is 1920×1080, the size of a maximum coding unit is set to 64×64, and a maximum depth is set to 3. For image data set 330 whose resolution is 352×288, the size of a maximum coding unit is set to 16×16, and a maximum depth is set to 1.

When the resolution is high or the amount of data is great, a maximum size of a coding unit may be set relatively great to increase a compression ratio and reflect image characteristics more precisely. Accordingly, for the image data sets 310 and 320 having higher resolution than the image data set 330, 64×64 may be selected as the size of a maximum coding unit.

A maximum depth indicates the total number of layers in the hierarchical coding units. Since the maximum depth of the image data set 310 is 2, a coding unit 315 of the image data set 310 may include a maximum coding unit whose longer axis size is 64 and sub coding units whose longer axis sizes are 32 and 16, according to an increase of a depth.

On the other hand, since the maximum depth of the image data set 330 is 1, a coding unit 335 of the image data set 330 may include a maximum coding unit whose longer axis size is 16 and coding units whose longer axis sizes are 8, according to an increase of a depth.

However, since the maximum depth of the image data 320 is 3, a coding unit 325 of the image data set 320 may include a maximum coding unit whose longer axis size is 64 and sub coding units whose longer axis sizes are 32, 16, 8 and 4 according to an increase of a depth. Since an image is encoded based on a smaller sub coding unit as a depth increases, exemplary embodiments are suitable for encoding an image including more minute scenes.

Figure 4:
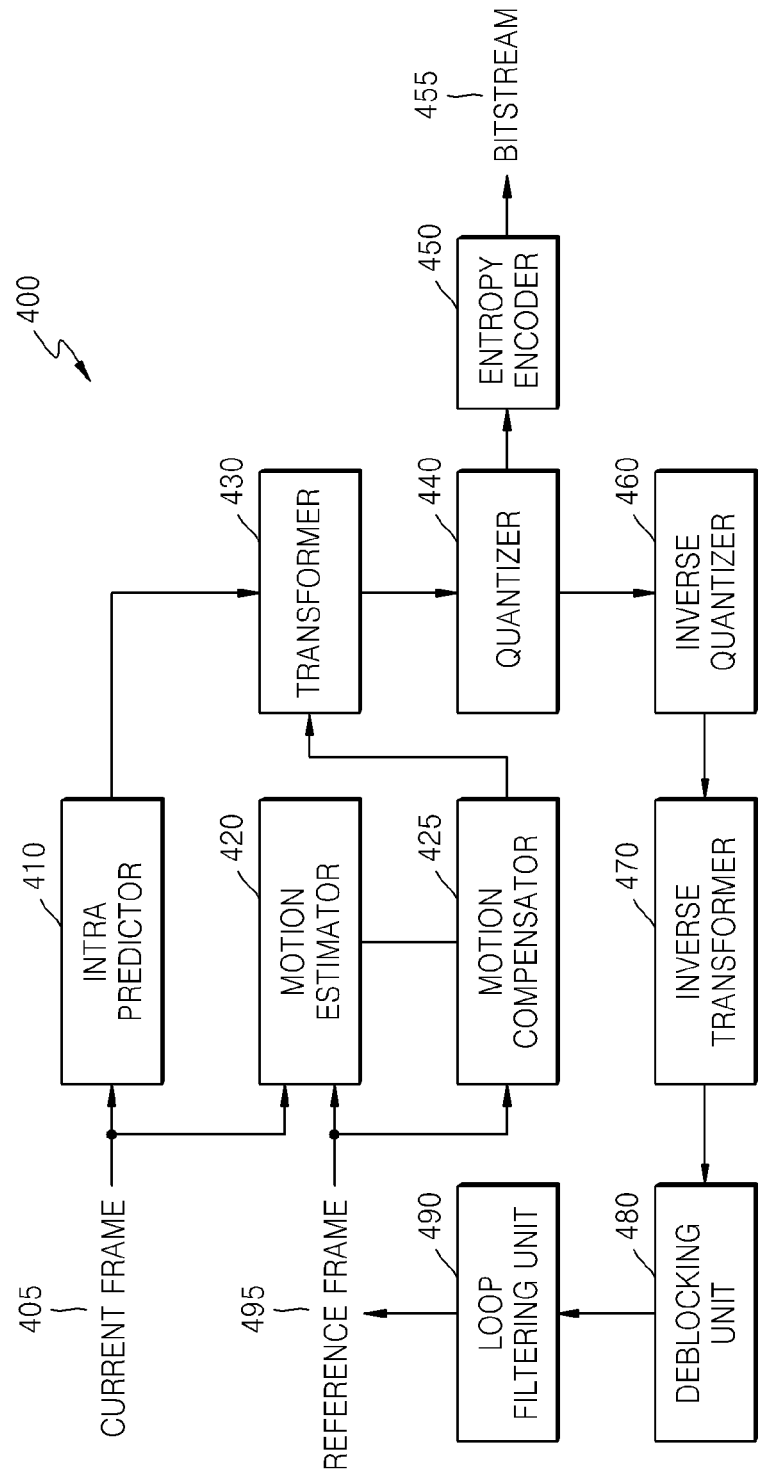
FIG. 4 is a block diagram of an image encoder based on a coding unit, according to an exemplary embodiment.

FIG. 4 is a block diagram of an image encoder 400 based on a coding unit, according to an exemplary embodiment. The image encoder 400, or one or more components thereof, may be implemented as a hardware device such as, for example, a processor of a computer or as a software module residing on the computer system.

An intra predictor 410 performs intra prediction on prediction units of the intra mode in a current frame 405, and a motion estimator 420 and a motion compensator 425 perform inter prediction and motion compensation on prediction units of the inter mode using the current frame 405 and a reference frame 495. The intra predictor 410, the motion estimator 420, the motion compensator 425, and the reference frame 495 may be implemented, for example, as hardware or software modules integrated within the image encoder 400 or separately from the image encoder 400.

Residual values are generated based on the prediction units output from the intra predictor 410, the motion estimator 420, and the motion compensator 425. The generated residual values are output as quantized transform coefficients by passing through a transformer 430 and a quantizer 440.

The quantized transform coefficients are restored to residual values by passing through an inverse quantizer 460 and an inverse transformer 470, and the restored residual values are post-processed by passing through a deblocking unit 480 and a loop filtering unit 490 and output as the reference frame 495. The quantized transform coefficients may be output as a bitstream 455 by passing through an entropy encoder 450.

To perform encoding based on an encoding method according to an exemplary embodiment, the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 of the image encoder 400 perform image encoding processes based on a maximum coding unit, a sub coding unit according to depths, a prediction unit, and a transform unit.

Figure 5:
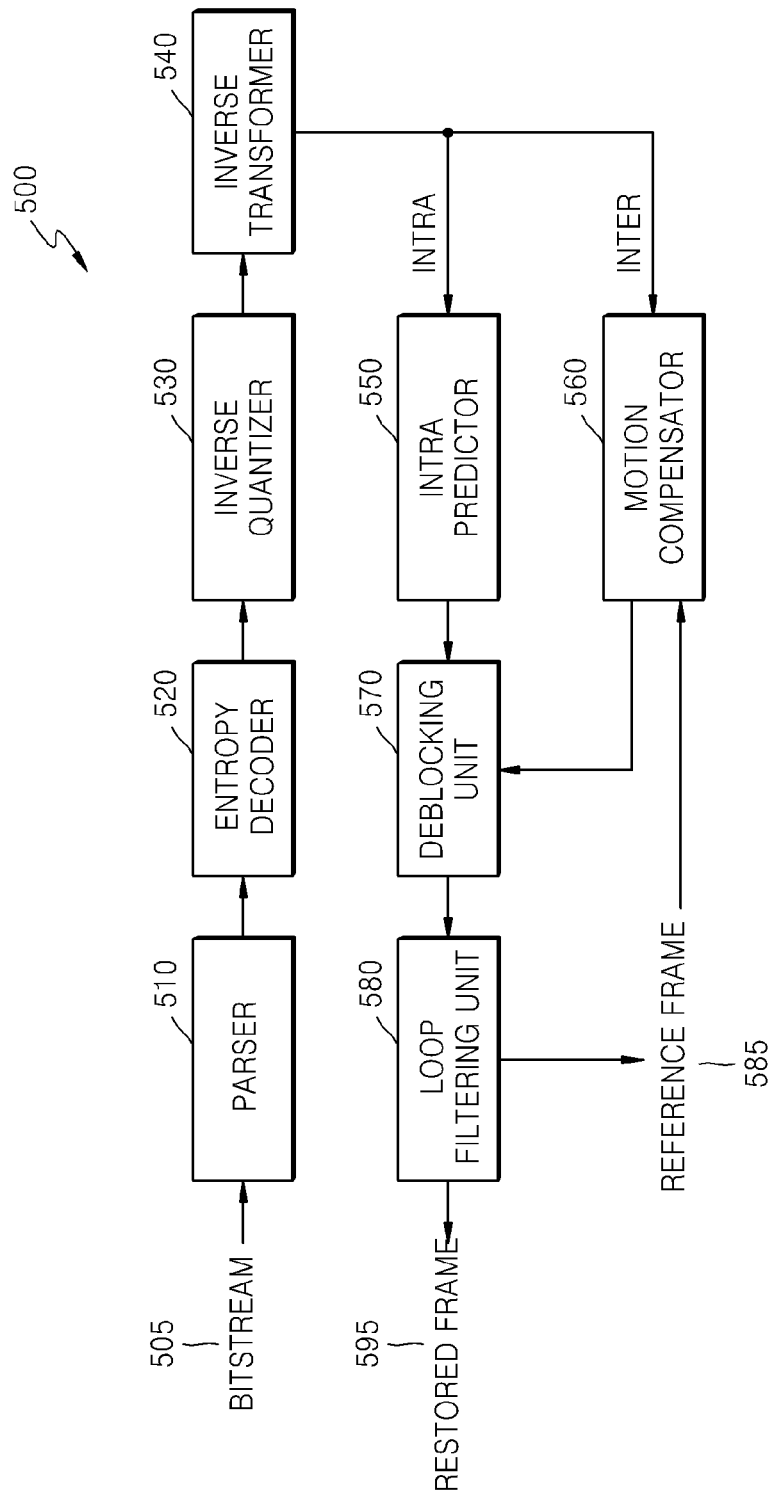
FIG. 5 is a block diagram of an image decoder based on a coding unit, according to an exemplary embodiment.

FIG. 5 is a block diagram of an image decoder 500 based on a coding unit, according to an exemplary embodiment. The image decoder 500, or one or more components thereof, may be implemented as a hardware device such as, for example, a processor of a computer or as a software module residing on the computer system.

A bitstream 505 passes through a parser 510 so that the encoded image data to be decoded and encoding information used for decoding are parsed. The encoded image data is output as inverse-quantized data by passing through an entropy decoder 520 and an inverse quantizer 530 and restored to residual values by passing through an inverse transformer 540. The residual values are restored according to coding units by being added to an intra prediction result of an intra predictor 550 or a motion compensation result of a motion compensator 560. The restored coding units are used for prediction of next coding units or a next frame by passing through a deblocking unit 570 and a loop filtering unit 580. The parser 510, the entropy decoder 520, the inverse quantizer 530, the inverse transformer 540, the intra predictor 550, the compensator 560, the deblocking unit 570, and the loop filtering unit 580 may be implemented, for example, as hardware or software modules integrated within the image decoder 500 or separately from the image decoder 500.

To perform decoding based on a decoding method according to an exemplary embodiment, the parser 510, the entropy decoder 520, the inverse quantizer 530, the inverse transformer 540, the intra predictor 550, the motion compensator 560, the deblocking unit 570, and the loop filtering unit 580 of the image decoder 500 perform image decoding processes based on a maximum coding unit, a sub coding unit according to depths, a prediction unit, and a transform unit.

In particular, the intra predictor 550 and the motion compensator 560 determine a prediction unit and a prediction mode in a sub coding unit by considering a maximum coding unit and a depth, and the inverse transformer 540 performs inverse transform by considering the size of a transform unit.

Figure 6:
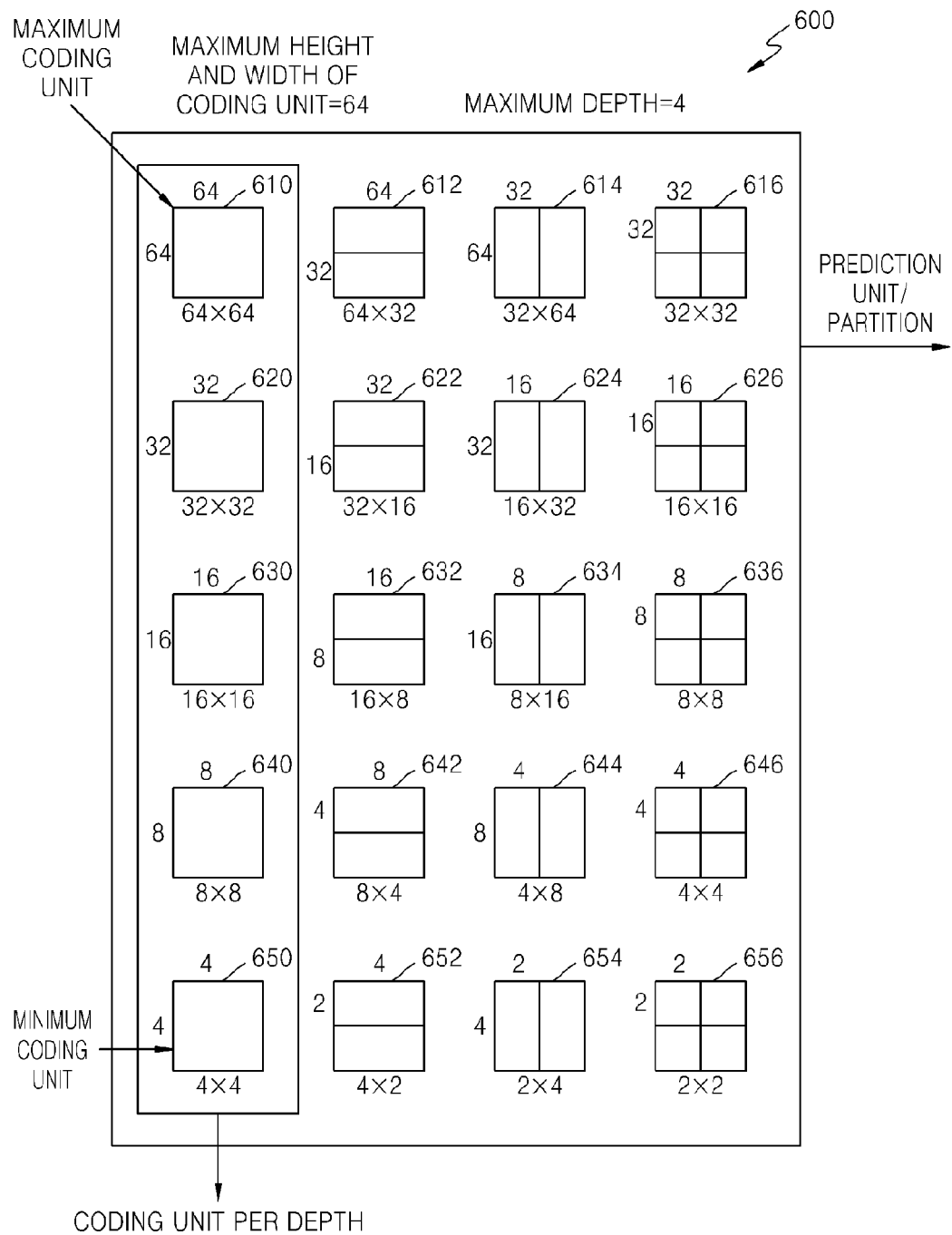
FIG. 6 illustrates a maximum coding unit, a sub coding unit, and a prediction unit, according to an exemplary embodiment.

FIG. 6 illustrates a maximum coding unit, a sub coding unit, and a prediction unit, according to an exemplary embodiment.

The image encoding apparatus 100 illustrated in FIG. 1 and the image decoding apparatus 200 illustrated in FIG. 2 use hierarchical coding units to perform encoding and decoding in consideration of image characteristics. A maximum coding unit and a maximum depth may be adaptively set according to the image characteristics or variously set according to requirements of a user.

In FIG. 6, a hierarchical coding unit structure 600 has a maximum coding unit 610 which is a maximum coding unit whose height and width are 64 and maximum depth is 4. A depth increases along a vertical axis of the hierarchical coding unit structure 600, and as a depth increases, heights and widths of sub coding units 620 to 650 decrease. Prediction units of the maximum coding unit 610 and the sub coding units 620 to 650 are shown along a horizontal axis of the hierarchical coding unit structure 600.

The maximum coding unit 610 has a depth of 0 and the size of an coding unit, or a height and a width, of 64×64. A depth increases along the vertical axis, and there exist a first sub coding unit 620 whose size is 32×32 and depth is 1, a second sub coding unit 630 whose size is 16×16 and depth is 2, a third sub coding unit 640 whose size is 8×8 and depth is 3, and a minimum coding unit 650 whose size is 4×4 and depth is 4. The minimum coding unit 650 whose size is 4×4 and depth is 4 is a minimum coding unit, and the minimum coding unit may be divided into prediction units, each of which is less than the minimum coding unit.

Referring to FIG. 6, examples of prediction units are shown along the horizontal axis according to each depth. That is, a prediction unit of the maximum coding unit 610 whose depth is 0 may be a prediction unit whose size is equal to the size 64×64 of the maximum coding unit, or a prediction unit 612 whose size is 64×32, a prediction unit 614 whose size is 32×64, or a prediction unit 616 whose size is 32×32, which has a size smaller than that of the maximum coding unit whose size is 64×64.

A prediction unit of the first sub coding unit 620 whose depth is 1 and size is 32×32 may be a prediction unit whose size is equal to the size 32×32 of the first sub coding unit, or a prediction unit 622 whose size is 32×16, a prediction unit 624 whose size is 16×32, or a prediction unit 626 whose size is 16×16, which has a size smaller than that of the first sub coding unit 620 whose size is 32×32.

A prediction unit of the second sub coding unit 630 whose depth is 2 and size is 16×16 may be a prediction unit whose size is equal to the size 16×16 of the second sub coding unit 630, or a prediction unit 632 whose size is 16×8, a prediction unit 634 whose size is 8×16, or a prediction unit 636 whose size is 8×8, which has a size smaller than that of the second sub coding unit 630 whose size is 16×16.

A prediction unit of the third sub coding unit 640 whose depth is 3 and size is 8×8 may be a prediction unit whose size is equal to the size 8×8 of the third sub coding unit 640 or a prediction unit 642 whose size is 8×4, a prediction unit 644 whose size is 4×8, or a prediction unit 646 whose size is 4×4, which has a size smaller than that of the third sub coding unit 640 whose size is 8×8.

The minimum coding unit 650 whose depth is 4 and size is 4×4 is a minimum coding unit and a coding unit of a maximum depth. A prediction unit of the minimum coding unit 650 may be a prediction unit 650 whose size is 4×4, a prediction unit 652 having a size of 4×2, a prediction unit 654 having a size of 2×4, or a prediction unit 656 having a size of 2×2.

Figure 7:
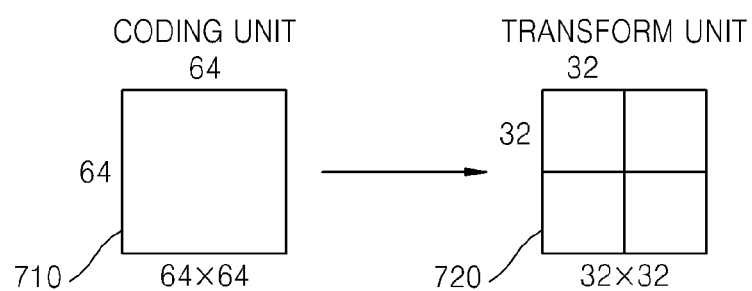
FIG. 7 illustrates a coding unit and a transform unit, according to an exemplary embodiment.

FIG. 7 illustrates a coding unit and a transform unit, according to an exemplary embodiment.

The image encoding apparatus 100 illustrated in FIG. 1 and the image decoding apparatus 200 illustrated in FIG. 2 perform encoding and decoding with a maximum coding unit itself or with sub coding units, which are equal to or smaller than the maximum coding unit, divided from the maximum coding unit. In the encoding and decoding process, the size of a transform unit for frequency transform is selected to be no larger than that of a corresponding coding unit. For example, if a current coding unit 710 has the size of 64×64, frequency transform may be performed using a transform unit 720 having the size of 32×32.

FIGS. 8A, 8B, 8C, and 8D illustrate division shapes of a coding unit 810, a prediction unit 860, and a transform unit 870, according to an exemplary embodiment.

Figure 8A:
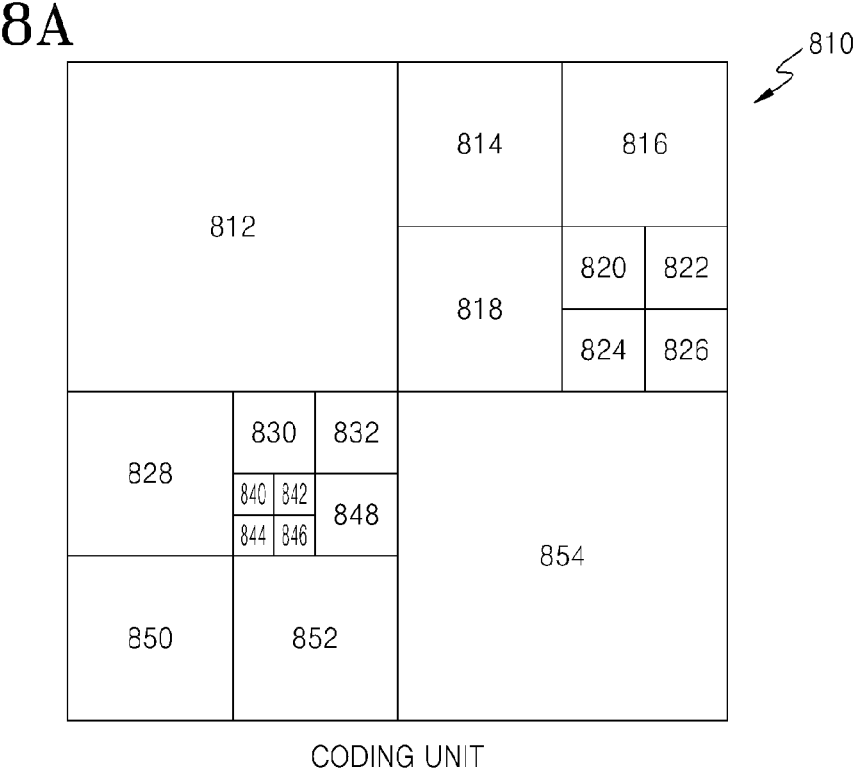
FIGS. 8A, 8B, 8C, and 8D illustrate division shapes of a coding unit, a prediction unit, and a transform unit, according to an exemplary embodiment.
Figure 8B:
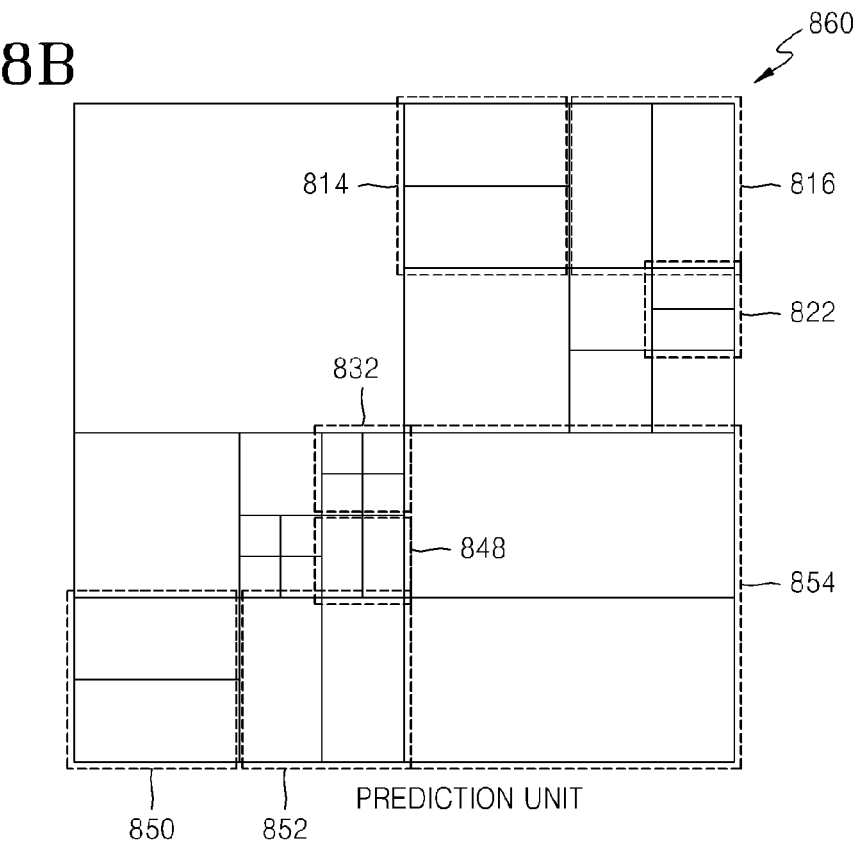

FIGS. 8A and 8B illustrate a coding unit 810 and a prediction unit 860, according to an exemplary embodiment.

FIG. 8A shows a division shape selected by the image encoding apparatus 100 illustrated in FIG. 1, to encode a maximum coding unit 810. The image encoding apparatus 100 divides the maximum coding unit 810 into various shapes, performs encoding, and selects an optimal division shape by comparing encoding results of various division shapes with each other based on the RD costs. When it is optimal that the maximum coding unit 810 be encoded as it is, the maximum coding unit 810 may be encoded without dividing the maximum coding unit 810 as illustrated in FIGS. 8A through 8D.

Referring to FIG. 8A, the maximum coding unit 810 whose depth is 0 is encoded by dividing it into sub coding units whose depths are equal to or greater than 1. That is, the maximum coding unit 810 is divided into 4 sub coding units whose depths are 1, and all or some of the sub coding units whose depths are 1 are divided into sub coding units 814, 816, 818, 828, 850, and 852 whose depths are 2.

A sub coding unit located in an upper-right side and a sub coding unit located in a lower-left side among the sub coding units whose depths are 1 are divided into sub coding units whose depths are equal to or greater than 2. Some of the sub coding units whose depths are equal to or greater than 2 may be divided into sub coding units 820, 822, 824, 826, 830, 832, 840, 842, 844, 846, and 848 whose depths are equal to or greater than 3.

FIG. 8B shows a division shape of a prediction unit 860 for the maximum coding unit 810.

Referring to FIG. 8B, a prediction unit 860 for the maximum coding unit 810 may be divided differently from the maximum coding unit 810. In other words, a prediction unit for each of sub coding units may be smaller than a corresponding sub coding unit.

For example, a prediction unit for a sub coding unit 854 located in a lower-right side among the sub coding units 812, 854 whose depths are 1 may be smaller than the sub coding unit 854. In addition, prediction units for sub coding units 814, 816, 850, and 852 of sub coding units 814, 816, 818, 828, 850, and 852 whose depths are 2 may be smaller than the sub coding units 814, 816, 850, and 852, respectively.

In addition, prediction units for sub coding units 822, 832, and 848 whose depths are 3 may be smaller than the sub coding units 822, 832, and 848, respectively. The prediction units may have a shape whereby respective sub coding units are equally divided by two in a direction of height or width or have a shape whereby respective sub coding units are equally divided by four in directions of height and width.

Figure 8C:
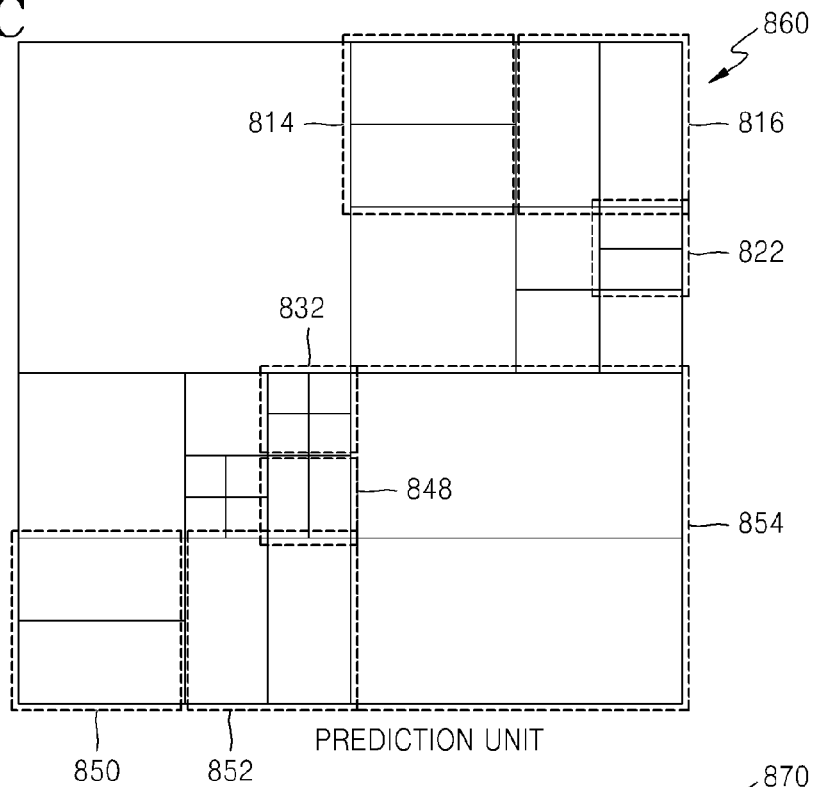
Figure 8D:
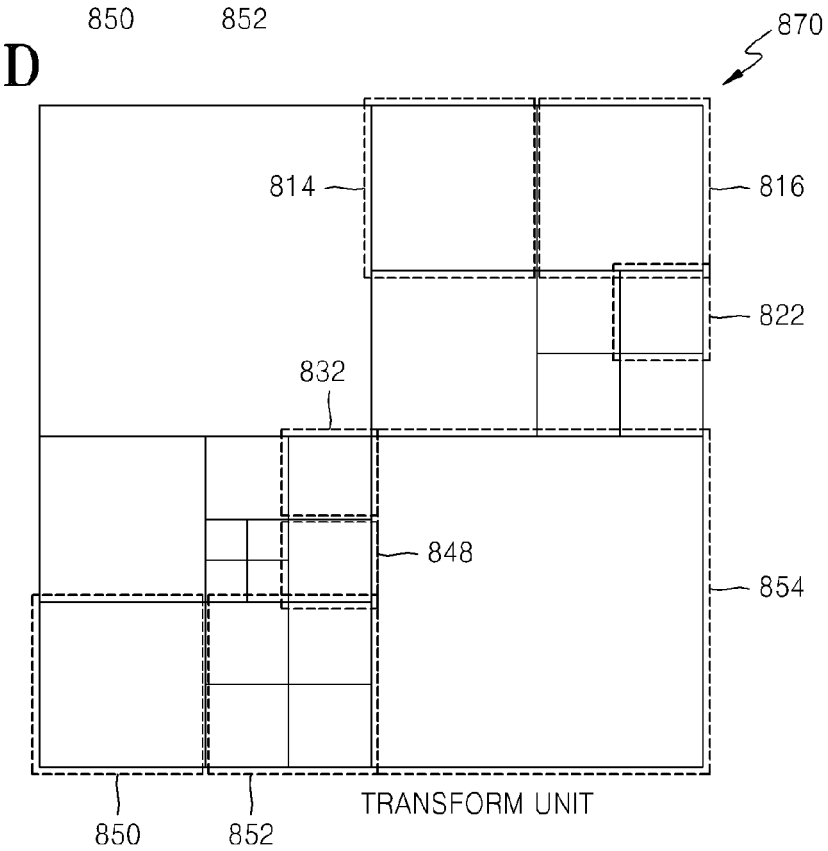

FIGS. 8C and 8D illustrate a prediction unit 860 and a transform unit 870, according to an exemplary embodiment.

FIG. 8C shows a division shape of a prediction unit 860 for the maximum coding unit 810 shown in FIG. 8B, and FIG. 8D shows a division shape of a transform unit 870 of the maximum coding unit 810.

Referring to FIG. 8D, a division shape of a transform unit 870 may be set differently from the prediction unit 860.

For example, even though a prediction unit for the sub coding unit 854 whose depth is 1 is selected with a shape whereby the height of the sub coding unit 854 is equally divided by two, a transform unit may be selected with the original size of the sub coding unit 854. Likewise, even though prediction units for sub coding units 814 and 850 whose depths are 2 are selected with a shape whereby the height of each of the sub coding units 814 and 850 is equally divided by two, a transform unit may be selected with the same size as the original size of each of the sub coding units 814 and 850.

A transform unit may be selected with a smaller size than a prediction unit. For example, when a prediction unit for the sub coding unit 852 whose depth is 2 is selected with a shape whereby the width of the sub coding unit 852 is equally divided by two, a transform unit may be selected with a shape whereby the sub coding unit 852 is equally divided by four in directions of height and width, which has a smaller size than the shape of the prediction unit.

Figure 9:
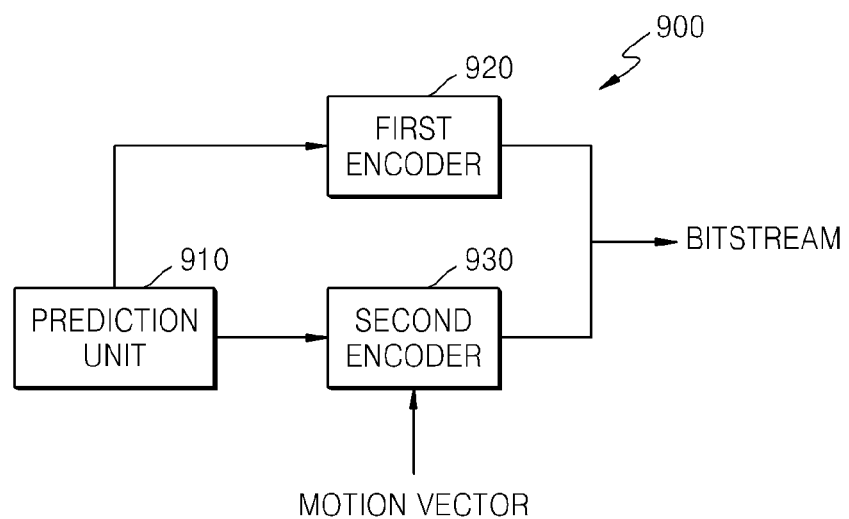
FIG. 9 is a block diagram of an apparatus for encoding a motion vector, according to an exemplary embodiment.

FIG. 9 is a block diagram of an apparatus 900 for encoding a motion vector, according to an exemplary embodiment.

The apparatus 900 for encoding a motion vector may be included in the apparatus 100 described above in association with FIG. 1 or the image decoder 400 described above in association with FIG. 4. Referring to FIG. 9, a motion vector encoding apparatus 900 according to an exemplary embodiment includes a prediction unit 910, a first encoder 920, and a second encoder 930.

In order to decode a block encoded using inter prediction, i.e., inter-picture prediction, information about a motion vector indicating a position difference between a current block and a similar block in a reference picture is used. Thus, information about motion vectors is encoded and inserted into a bitstream in an image encoding process. However, if the information about motion vectors is encoded and inserted as it is, an overhead for encoding the information about motion vectors increases, thereby decreasing a compression ratio of image data.

Therefore, in an image encoding process, information about a motion vector is compressed by predicting a motion vector of a current block, encoding only a differential vector between a motion vector predictor generated as a result of prediction and an original motion vector, and inserting the encoded differential vector into a bitstream. FIG. 9 shows an apparatus 900 for encoding a motion vector, which uses such a motion vector predictor.

Referring to FIG. 9, the prediction unit 910 determines whether a motion vector of a current block is prediction-encoded based on an explicit mode or an implicit mode.

As described above, such a codec as MPEG-4 H.264/MPEG-4 AVC uses motion vectors of previously encoded blocks adjacent to a current block to predict a motion vector of the current block. For example, a median of motion vectors of previously encoded blocks adjacent to left, upper, and upper-right sides of the current block may be used as a motion vector predictor of the current block. Since motion vectors of all blocks encoded using inter prediction are predicted using the same method, information about a motion vector predictor does not have to be encoded separately. However, the apparatus 100 or the image decoder 400, according to an exemplary embodiment, uses both a mode in which information about a motion vector predictor is not encoded separately and a mode in which information about a motion vector predictor is encoded in order to more exactly predict a motion vector, which will now be described in detail.

(1) Explicit Mode

One of methods of encoding a motion vector predictor, which can be selected by the prediction unit 910, can be a mode of explicitly encoding information about a motion vector predictor of a current block. The explicit mode is a mode of separately encoding information indicating which motion vector predictor from among at least one motion vector predictor candidate is used to predict a motion vector of a current block. Motion vector predictor candidates according to an exemplary embodiment will be described with reference to FIGS. 10A, 10B, and 11A to 11C.

Figure 10A:
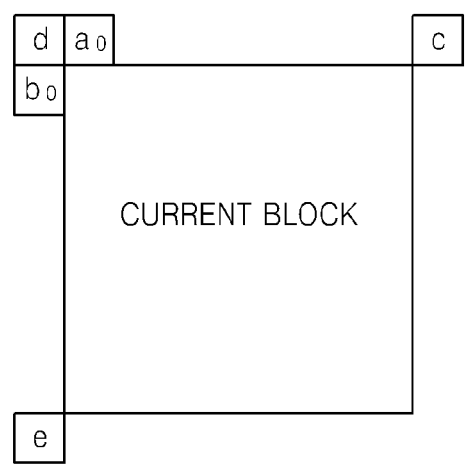
FIGS. 10A and 10B illustrate motion vector predictor candidates of an explicit mode, according to an exemplary embodiment.
Figure 10B:
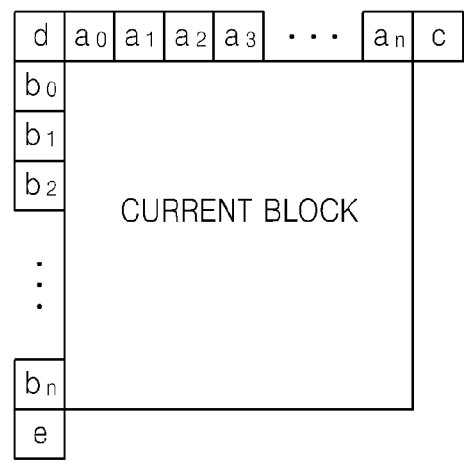

FIGS. 10A and 10B illustrate motion vector predictor candidates of an explicit mode, according to an exemplary embodiment.

Referring to FIG. 10A, a motion vector predicting method according to an exemplary embodiment can use one of motion vectors of previously encoded blocks adjacent to a current block as a motion vector predictor of the current block. A block $a_0$ in the leftmost among blocks adjacent to an upper side of the current block, a block $b_0$ in the upper-most among blocks adjacent to a left side thereof, a block c adjacent to an upper-right side thereof, a block d adjacent to an upper-left side thereof, and a block e adjacent to a lower-left side thereof can be used for motion vector predictors of the current block.

In a method of encoding an image and a method of decoding an image according to exemplary embodiments, an image is encoded and decoded based on coding units having different sizes differentiated according to depths. Thus, a motion vector of the block adjacent to the lower-left side of the current block may also be used as a motion vector predictor of the current block.

Referring to FIG. 8A, if a current block is a coding unit 820, a coding unit 814 adjacent to an upper-left side of the current block, a coding unit 816 in a leftmost block among blocks adjacent to an upper side of the current block, a coding unit 818 in an upper-most block among blocks adjacent to a left side thereof, a coding unit 822 adjacent to an upper-right side thereof, and a coding unit 824 adjacent to a lower-left side thereof are encoded before the current block. Thus, a motion vector of a block adjacent to the lower-left side of the current block may be used as a motion vector predictor of the current block.

Referring to FIG. 10B, motion vectors of all blocks adjacent to a current block can be used as motion vector predictors of the current block. In other words, motion vectors of not only a block $a_0$ in the leftmost among blocks adjacent to an upper side of the current block but also all blocks $a_0$ to $a_n$ adjacent to the upper side thereof can be used as motion vector predictors of the current block, and motion vectors of not only a block $b_0$ in the upper-most among blocks adjacent to a left side thereof but also all blocks $b_0$ to $b_n$ adjacent to the left side thereof can be used as motion vector predictors of the current block.

Alternatively, a median value of motion vectors of adjacent blocks can be used as a motion vector predictor. In other words, median(mv_a0, mv_b0, mv_c) can be used a motion vector predictor of the current block, wherein mv_a0 denotes a motion vector of the block a0, mv_b0 denotes a motion vector of the block b0, and mv_c denotes a motion vector of the block c.

Motion vector predictor candidates of the current block can be limited according to the size of the current block and sizes of blocks adjacent to the current block. This will be described in detail with reference to FIGS. 10C through 10E.

Figure 10C:
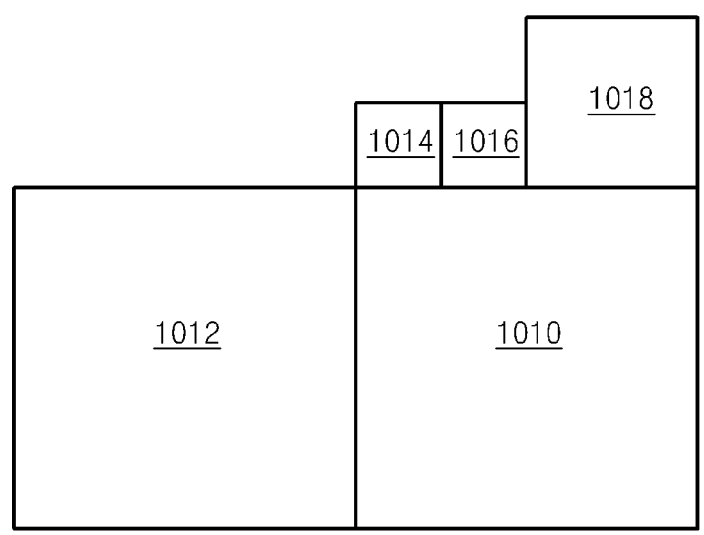
FIGS. 10C through 10E illustrate blocks having various sizes that are adjacent to a current block, according to an exemplary embodiment.
Figure 10D:
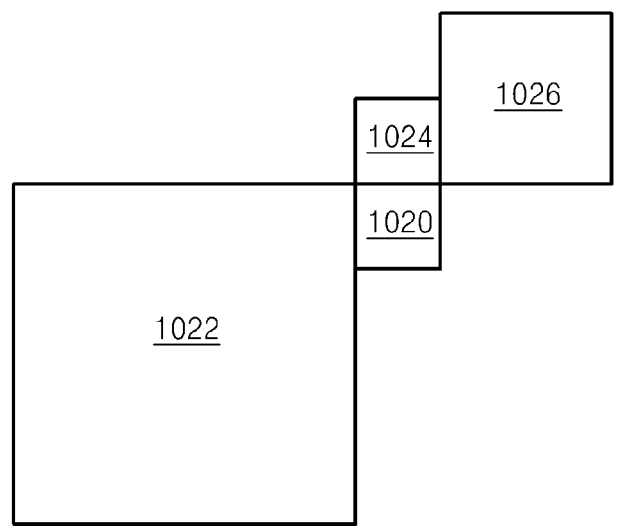
Figure 10E:
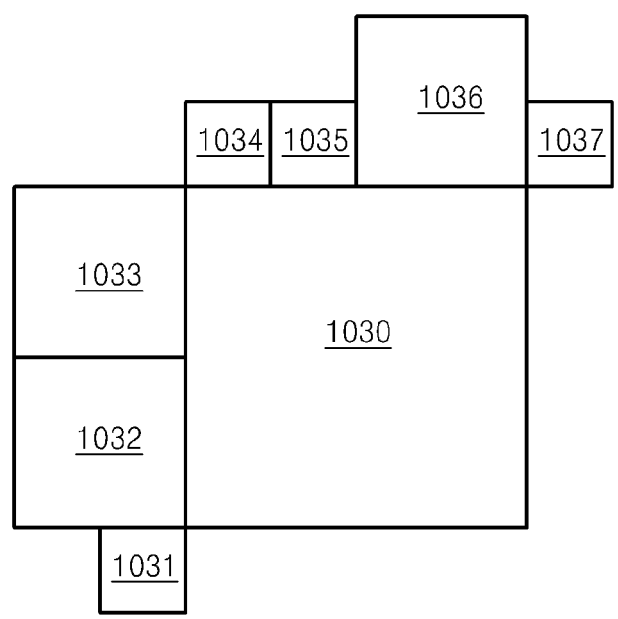

FIGS. 10C through 10E illustrate blocks having various sizes adjacent to a current block, according to an exemplary embodiment.

As described above, in the method of encoding an image and the method of decoding an image according to exemplary embodiments, the image is encoded using coding units having various sizes and prediction units having various sizes, which are determined according to depths. Thus, the sizes of blocks adjacent to the current block may vary. Thus, if the size of the current block differs greatly from the sizes of some blocks adjacent to the current block, motion vectors of one or more blocks having different sizes adjacent to the current block may not be used as motion vector predictors of the current block.

Referring to FIG. 10C, blocks 1014 through 1018 adjacent to the upper side of a current block 1010 are blocks having sizes smaller than the size of the current block 1010. Since there may be a high possibility that the motion vector of a block 1012, which is adjacent to the current block 1010 and has the same size as that of the current block 1010, may be the same as or similar to the motion vector of the current block 1010, the prediction unit 910 may use only the motion vector of the block 1012, which is adjacent to the current block 1010 and has the same size as that of the current block 1010, as a motion vector predictor.

Even though the size of the block 1012 is not the same as the size of the current block 1010, only motion vectors of blocks, which are adjacent to the current block 1010 and have predetermined sizes, may be used as motion vector predictors. For example, only motion vectors of blocks 1012 and 1018 having sizes that are equal to or greater than ¼ of the size of the current block 1010 may be used as motion vector predictors.

Referring to FIG. 10D, the size of a block 1022 adjacent to the left side of a current block 1020 is 16 times the size of the current block 1020, and there is a great difference therebetween. Due to this great difference, there may be a low possibility that the motion vector of the block 1022 adjacent to the left side of the current block 1020 may be the same as or similar to the motion vector of the current block 1020. Thus, the motion vector of the block 1022 adjacent to the left side of the current block 1020 may not be used as a motion vector predictor of the current block 1020, and only a motion vector of a block 1024 adjacent to the upper side of the current block 1020 and a motion vector of a block 1026 adjacent to the upper-left side of the current block 1020 may be used as motion vector predictors of the current block 1020.

Referring to FIG. 10E, the size of a current block 1030 is greater than sizes of all blocks 1031 through 1037 adjacent to the current block 1030. In this case, if motion vectors of all blocks 1031 through 1037 adjacent to the current block 1030 are used as motion vector predictors of the current block 1030, the number of motion vector predictor candidates of the current block 1030 may be too large. As a difference between the size of the current block 1030 and the sizes of the blocks 1031 through 1037 adjacent to the current block 1030 is increased, the number of motion vector predictor candidates is increased. Thus, the prediction unit 910 illustrated in FIG. 9 does not use motion vectors of one or more blocks adjacent to the current block 1030 as motion vector predictors of the current block 1030.

For example, in the exemplary embodiment of FIG. 10E, a motion vector of the block 1031 adjacent to the lower-left side of the current block 1030 and a motion vector of the block 1037 adjacent to the upper-right side of the current block 1030 may not be used as motion vector predictors of the current block 1030.

Thus, if the size of the current block 1030 is equal to or greater than a predetermined size, motion vectors of blocks adjacent to the current block 1030 in predetermined directions may not be used as motion vector predictors of the current block 1030.

Figure 11A:
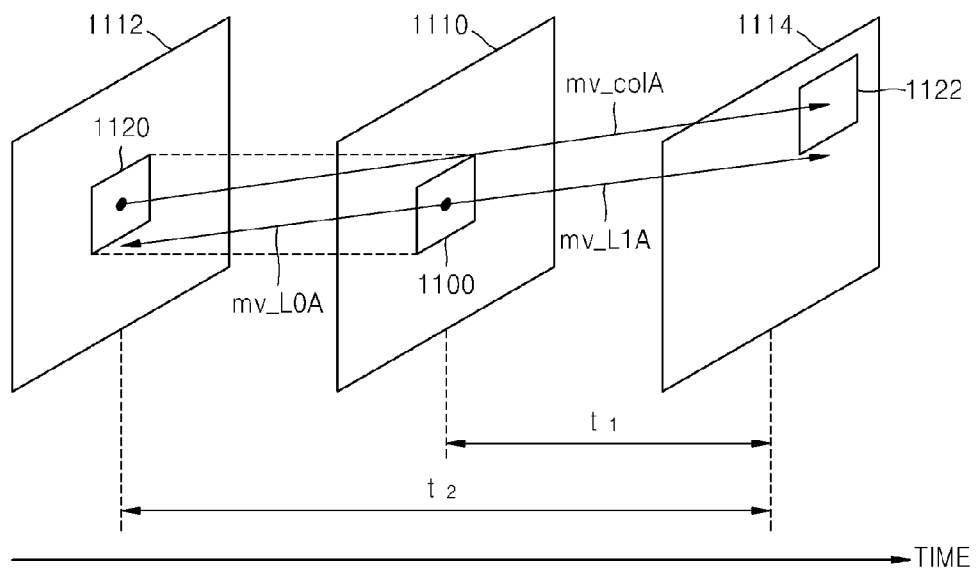
FIGS. 11A through 11C illustrate motion vector predictor candidates of a clear mode, according to another exemplary embodiment.
Figure 11B:
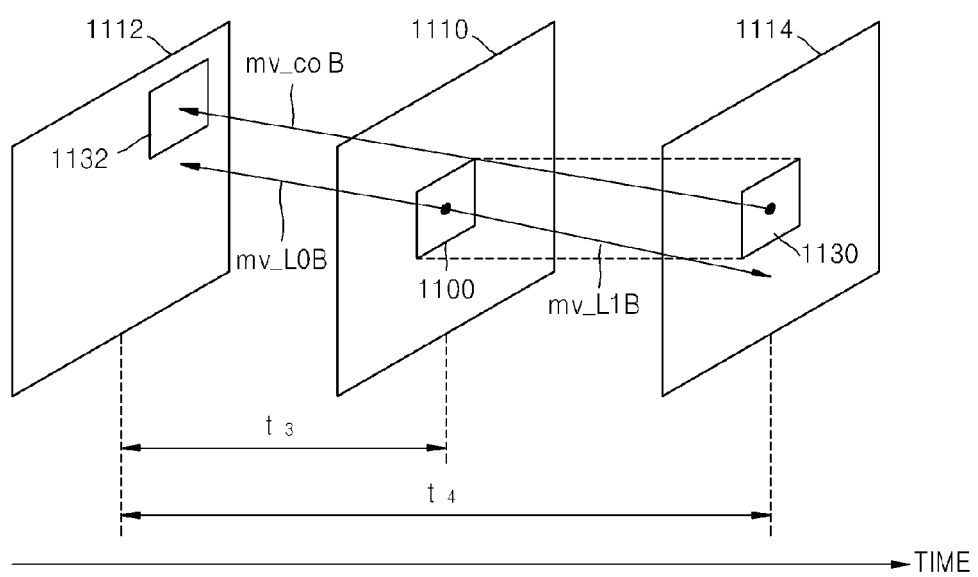
Figure 11C:
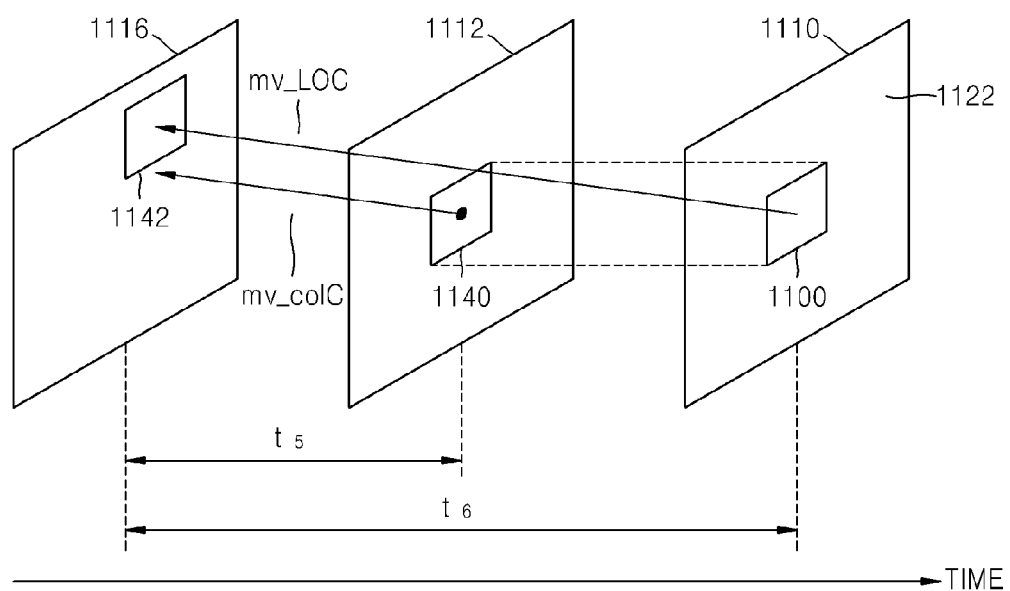

FIGS. 11A through 11C illustrate motion vector predictor candidates of an explicit mode, according to another exemplary embodiment.

FIG. 11A illustrates a method of calculating a motion vector predictor of a Bi-directional Predictive Picture (referred to as 'B picture'), according to an exemplary embodiment. When a current picture including a current block is a B picture in which bi-directional prediction is performed, a motion vector generated based on a temporal distance may be a motion vector predictor.

A motion vector predictor mv_temporal of a current block 1100 of a current picture 1110 can be generated using a motion vector of a block 1120 in a co-located position of a temporally preceding picture 1112. For example, if a motion vector mv_colA of the block 1120 in a position co-located with the current block 1100 is generated for a searched block 1122 of a temporally following picture 1114 of the current picture 1110, motion vector predictor candidates mv_L0A and mv_L1A of the current block 1100 can be generated in accordance with the equations below:

$$mv\_L1A=(t1/t2)\times mv\_colA$$

$$mv\_L0A=mv\_L1A-mv\_colA$$

where mv_L0A denotes a motion vector predictor of the current block 1100 for the temporally preceding picture 1112, and mv_L1A denotes a motion vector predictor of the current block 1100 for the temporally following picture 1114.

In the exemplary embodiment of FIG. 11A, the current picture 1110 that is a B picture exists between the temporally preceding picture 1112 and the temporally following picture 1114. In this case, if the motion vector mv_colA of the block 1120 in a position co-located with the current block 1100 is generated from the temporally following picture 1114, the motion vector of the current block 1100 may be more accurately predicted based on mv_L1A. In other words, compared to a case when mv_colA is a motion vector having an opposite direction to a direction illustrated in FIG. 11A, i.e., a case when mv_colA is generated from another picture before the temporally preceding picture 1112, when mv_colA is a motion vector in the direction of FIG. 11A, the motion vector of the current block 1100 may be more accurately predicted.

Thus, if a direction from the current block 1100 to the block 1120 in a position co-located with the current block 1100 is a direction List0, the motion vector mv_colA of the block 1120 in a position co-located with the current block 1100 should be in a direction List1 so that a possibility that the current picture 1110 may exist between the temporally preceding picture 1112 and the temporally following picture 1114, as illustrated in FIG. 11A, can increase and the motion vector of the current block 1100 can be more accurately predicted based on mv_colA.

In addition, since the pictures 1110 through 1114 illustrated in FIG. 11A are arranged in a temporal sequence, a motion vector predictor mv_temporal of the current block 1100 may be generated based on a picture order count (POC). Since a picture referred to by the current block 1100 may be a picture that is different from the pictures 1112 and 1114 illustrated in FIG. 11A, the motion vector predictor mv_temporal of the current block 1100 is generated based on the POC.

For example, if a POC of a current picture is CurrPOC and a POC of a picture referred to by the current picture is CurrRefPOC, the motion vector predictor mv_temporal of the current block 1100 can be generated in accordance with the equations below:

$$Scale=(CurrPOC-CurrRefPOC)/(ColPOC-ColRefPOC)$$

$$mv\_temporal=Scale*mv\_colA$$

where ColPOC is a POC of the temporally preceding picture 1112 in which a block 1120 in a position co-located with the current block 1100 is included, and ColRefPOC is a POC of the temporally following picture 1114 in which a block 1122 referred to by the block 1120 in a position co-located with the current block 1100 is included.

FIG. 11B illustrates a method of generating a motion vector predictor of a B picture, according to another exemplary embodiment. Compared with the method illustrated in FIG. 11A, a block in a position co-located with the current block 1100 exists in the temporally following picture 1114.

Referring to FIG. 11B, a motion vector predictor of the current block 1100 of the current picture 1110 can be generated using a motion vector of a block 1130 in a co-located position of the temporally following picture 1114. For example, if a motion vector mv_colB of the block 1130 in a position co-located with the current block 1100 is generated for a searched block 1132 of the temporally preceding picture 1112 of the current picture 1110, motion vector predictor candidates mv_L0B and mv_L1B of the current block 1100 can be generated in accordance with the equations below:

$$mv\_L0B=(t3/t4)\times mv\_colB$$

$$mv\_L1B=mv\_L0B-mv\_colB$$

where mv_L0B denotes a motion vector predictor of the current block 1100 for the temporally preceding picture 1112, and mv_L1B denotes a motion vector predictor of the current block 1100 for the temporally following picture 1114.

Similar to FIG. 11A, in the exemplary embodiment of FIG. 11B, the current picture 1110 that is a B picture exists between the temporally preceding picture 1112 and the temporally following picture 1114. Thus, if the motion vector mv_colB of the block 1130 in a position co-located with the current block 1100 is generated for the temporally preceding picture 1112, a motion vector of the current block 1100 may be more accurately predicted based on mv_L0B. In other words, compared to a case when mv_colB is a motion vector having an opposite direction to a direction illustrated in FIG. 11B, i.e., a case when mv_colB is generated from another picture after the temporally following picture 1114, when mv_colB is a motion vector in the direction of FIG. 11B, the motion vector of the current block 1100 may be more accurately predicted.

Thus, if a direction from the current block 1100 to the block 1130 in a position co-located with the current block 1100 is a direction List1, the motion vector mv_colB of the block 1130 in a position co-located with the current block 1100 should be in the direction List0 so that a possibility that the current picture 1110 may exist between the temporally preceding picture 1112 and the temporally following picture 1114, as illustrated in FIG. 11B, can increase and the motion vector of the current block 1100 can be more accurately predicted based on mv_colB.

In addition, since a picture referred to by the current block 1100 may be a picture other than the pictures 1112 and 1114 illustrated in FIG. 11B, a motion vector predictor of the current block 1100 may be generated based on the POC.

For example, if a POC of a current picture is CurrPOC and a POC of a picture referred to by the current picture is CurrRefPOC, the motion vector predictor of the current block 1100 can be generated in accordance with the equations below:

$$Scale=(CurrPOC-CurrRefPOC)/(ColPOC-ColRefPOC)$$

$$mv\_temporal=Scale*mv\_colB$$

where ColPOC is a POC of the temporally following picture 1114 in which a block 1130 in a position co-located with the current block 1100 is included, and ColRefPOC is a POC of the temporally preceding picture 1112 in which a block 1132 referred to by the block 1130 in a position co-located with the current block 1100 is included.

In the generation of a motion vector of the current block 1100 of a B picture by using the prediction unit 910, one of the methods illustrated in FIGS. 11A and 11B can be used. In other words, since a motion vector predictor is generated using a motion vector and a temporal distance of the block 1120 or 1130 in a position co-located with the current block 1100, motion vector predictors can be generated using the methods illustrated in FIGS. 11A and 11B only if motion vectors of the blocks 1120 and 1130 in the co-located position exist. Thus, the prediction unit 910 according to an exemplary embodiment generates a motion vector predictor of the current block 1100 using only a block having a motion vector among the blocks 1120 and 1130 in the co-located position.

For example, when the block 1120 in a co-located position of the temporally preceding picture 1112 is encoded using intra prediction instead of inter prediction, a motion vector of the block 1120 does not exist, and thus a motion vector predictor of the current block 1100 cannot be generated using the method of generating a motion vector predictor as illustrated in FIG. 11A.

The block 1120 in a co-located position of the temporally preceding picture 1112 and the block 1130 in a co-located position of the temporally following picture 1114 may be used to generate the motion vector predictor of the current picture 1110 of the B picture by using the prediction unit 910, as illustrated in FIGS. 11A and 11B. Thus, a motion vector predictor of the current block 1100 can be decoded only if the apparatus 900 for encoding a motion vector knows which block of the blocks 1120 and 1130, in a position co-located with the current block 1100, is used to generate the motion vector predictor mv_temporal.

To this end, the apparatus 900 for encoding a motion vector may encode information for specifying which block of the blocks 1120 and 1130 in a position co-located with the current block 1100 is used to generate the motion vector predictor mv_temporal and may insert encoded information into a block header or a slice header.

FIG. 11C illustrates a method of generating a motion vector predictor of a P picture, according to an exemplary embodiment.

Referring to FIG. 11C, a motion vector predictor of the current block 1100 of the current picture 1110 can be generated using a motion vector of a block 1140 in a co-located position of the temporally preceding picture 1112. For example, if a motion vector mv_colC of the block 1140 in a position co-located with the current block 1100 is generated for a searched block 1142 of another temporally preceding picture 1116, a motion vector predictor candidate mv_L0C of the current block 1100 can be generated in accordance with the equation below:

$$mv\_L0C = (t6/t5) \times mv\_colC.$$

As described above in association with FIGS. 11 and 11B, mv_L0C may also be generated based on the POC. Based on the POC of the current picture 1110, the POC of the picture referred to by the current picture 1110, the POC of the temporally preceding picture 1112, and the POC of another temporally preceding picture 1116, mv_L0C may be generated.

Since the current picture 1110 is a P picture, the number of motion vector predictors of the current block 1100 is 1 unlike FIGS. 11A and 11B.

In summary, a set C of motion vector predictor candidates according to FIGS. 10A, 10B, and 11A to 11C can be generated in accordance with the equation below:

$$C = \{median(mv\_a0, mv\_b0, mv\_c), mv\_a0, mv\_a1 \ldots, mv\_aN, mv\_b0, mv\_b1, \ldots, mv\_bN, mv\_c, mv\_d, mv\_e, mv\_temporal\}.$$

Alternatively, the set C may be generated by reducing the number of motion vector predictor candidates in accordance with the equation below:

$$C = \{median(mv\_a', mv\_b', mv\_c'), mv\_a', mv\_b', mv\_c', mv\_temporal\}.$$

Herein, mv_x denotes a motion vector of a block x, median( ) denotes a median value, and mv_temporal denotes motion vector predictor candidates generated using a temporal distance described above in association with FIGS. 11A to 11C.

In addition, mv_a' denotes a very first valid motion vector among mv_a0, mv_a1 . . . , mv_aN. For example, when a block a0 has been encoded using intra prediction or refers to a picture different from a picture referred to by the current block, a motion vector mv_a0 of the block a0 is not valid, and thus mv_a'=mv_a1, and if a motion vector of a block a1 is also not valid, mv_a'=mv_a2.

Likewise, mv_b' denotes the very first valid motion vector among mv_b0, mv_b1 . . . , mv_bN, and mv_c' denotes the very first valid motion vector among mv_c, mv_d, and mv_e.

A motion vector of a block that refers to a picture different from a picture referred to by the current block, from among motion vectors of blocks adjacent to the current block, may not predict a motion vector of the current block efficiently. Thus, the motion vector of the block that refers to a picture different from a picture referred to by the current block may be excluded from the set C of motion vector predictor candidates.

The explicit mode is a mode of encoding information indicating which motion vector has been used for a motion vector predictor of a current block. For example, when a motion vector is encoded in the explicit mode, a binary number can be allocated to each of elements of the set C, i.e., motion vector predictor candidates, and if one of them is used as a motion vector predictor of a current block, a corresponding binary number can be output.

Since a corresponding binary number is allocated to each motion vector predictor candidate so as to specify one of the elements of the set C and is output, as the number of elements of the set C decreases, the elements of the set C may be specified as binary numbers with smaller bits.

Thus, if an overlapping motion vector predictor candidate is present in the set C, the overlapping motion vector predictor candidate may be excluded from the set C, and binary numbers are allocated to the motion vector predictor candidates. For example, when the set C={median(mv_a', mv_b', mv_c'), mv_a', mv_b', mv_c', mv_temporal}, as described above, if mv_a', mv_b', and mv_c' are all the same, the set C may be determined as three elements like in C={median(mv_a', mv_b', mv_c'), mv_a', mv_temporal}, and the binary numbers are allocated. If the elements of the set C may be specified using 3 bits before the overlapping motion vector predictor candidate is excluded from the set C, the elements of the set C may be specified using 2 bits after the overlapping motion vector predictor candidate is excluded from the set C.

Instead of excluding the overlapping motion vector predictor candidate from the set C, a predetermined weight may be added so as to increase a probability that the overlapping motion vector predictor candidate may be determined as the motion vector predictor of the current block. Since, in the example described above, mv_a', mv_b', and mv_c' are all the same and only mv_a' is included in the set C, a probability that mv_a' may be determined as the motion vector predictor of the current block may be increased by adding a predetermined weight to mv_a'.

In addition, when there is just one motion vector predictor candidate, in spite of the explicit mode, binary numbers for specifying one of motion vector predictor candidates may not be encoded. For example, when the set C={median(mv_a0, mv_b0, mv_c), mv_a0, mv_a1 . . . , mv_aN, mv_b0, mv_b1, . . . , mv_bN, mv_c, mv_d, mv_e, mv_temporal} and if blocks a0 through aN, blocks b0 through bN, a block c, a block d, and a block e are intra-predicted blocks, the set C={mv_temporal} and thus substantially includes one element. Thus, in this case, the apparatus 900 for encoding a motion vector may not encode binary numbers for specifying one motion vector predictor candidate from among a plurality of motion vector predictor candidates in spite of the explicit mode.

It will be easily understood by those of ordinary skill in the art that other motion vector predictor candidates besides those described above in association with the explicit mode can be used.

(2) Implicit Mode

Another one of the methods of encoding a motion vector predictor, which can be selected by the prediction unit 910, is a mode of encoding only information indicating that a motion vector predictor of a current block is generated based on blocks or pixels included in a previously encoded area adjacent to the current block. Unlike the explicit mode, the implicit mode is a mode of encoding information indicating generation of a motion vector predictor in the implicit mode without encoding information for specifying a motion vector predictor.

As described above, such a codec as MPEG-4 H.264/MPEG-4 AVC uses motion vectors of previously encoded blocks adjacent to a current block to predict a motion vector of the current block. That is, a median of motion vectors of previously encoded blocks adjacent to left, upper, and upper-right sides of the current block is used as a motion vector predictor of the current block. In this case, unlike the explicit mode, information for selecting one of motion vector predictor candidates does not have to be encoded.

In other words, if only information indicating that a motion vector predictor of a current block has been encoded in the implicit mode is encoded in an image encoding process, a median value of motion vectors of previously encoded blocks adjacent to left, upper, and upper-right sides of the current block can be used as a motion vector predictor of the current block in an image decoding process.

In addition, an image encoding method according to an exemplary embodiment provides a new implicit mode of generating a motion vector predictor by using previously encoded pixel values adjacent to the current block as a template. This will be described in detail with reference to FIG. 12A.

Figure 12A:
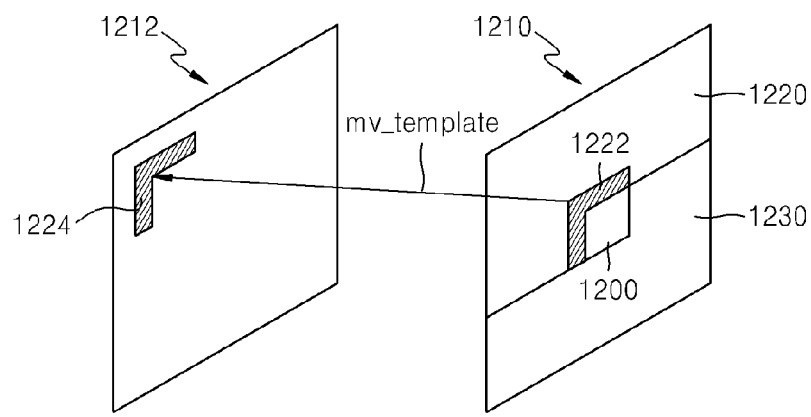
FIG. 12A illustrates a method of generating a motion vector predictor of an implicit mode, according to an exemplary embodiment.

FIG. 12A illustrates a method of generating a motion vector predictor in the explicit mode, according to an exemplary embodiment.

Referring to FIG. 12A, pixels 1222 included in a previously encoded area 1220 adjacent to a current block 1200 of a current picture 1210 are used to generate a motion vector predictor of the current block 1200. Corresponding pixels 1224 are determined by searching a reference picture 1212 using the adjacent pixels 1222. The corresponding pixels 1224 can be determined by calculating a Sum of Absolute Differences (SAD). When the corresponding pixels 1224 are determined, a motion vector mv_template of the adjacent pixels 1222 is generated, and the motion vector mv_template can be used as a motion vector predictor of the current block 1200.

A set C of motion vector predictor candidates may be used to search mv_template from the reference picture 1212. This will now be described in detail with reference to FIG. 12B.

Figure 12B:
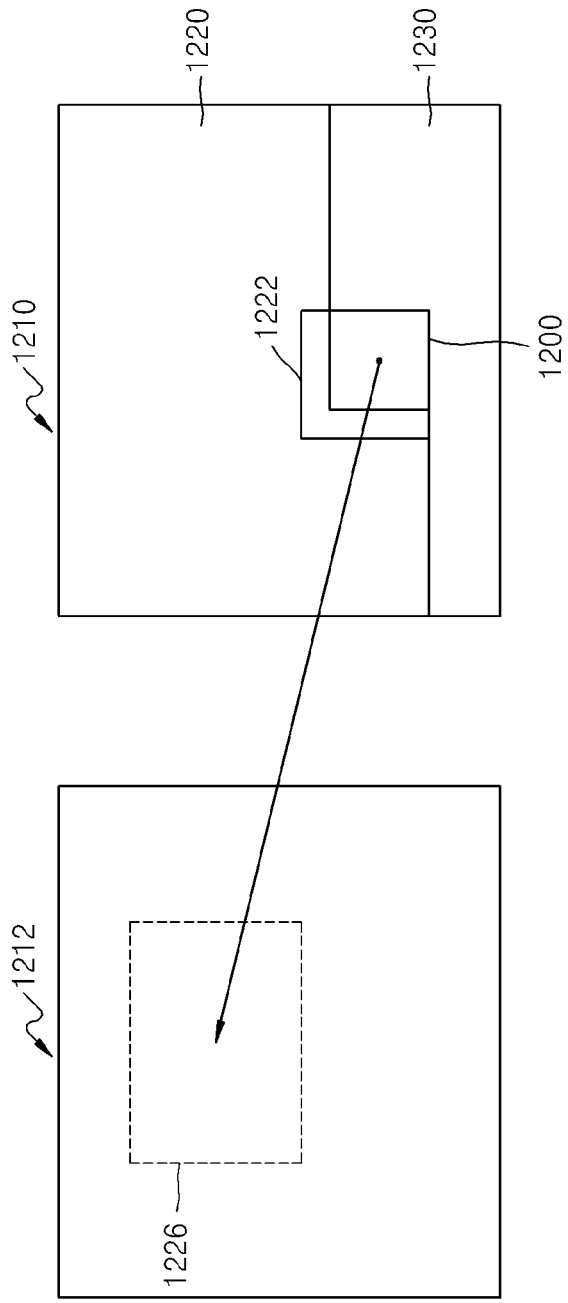
FIG. 12B illustrates a method of searching for a motion vector predictor of an implicit mode, according to an exemplary embodiment.

FIG. 12B illustrates a method of searching for a motion vector predictor of an implicit mode, according to an exemplary embodiment.

Referring to FIG. 12B, when the prediction unit 910 searches the reference picture 1212 by using the pixels 1222 adjacent to the current block 1200, a predetermined search range 1226 may be set, and corresponding pixels 1224 may be searched only within the predetermined search range 1226.

The search range 1226 may be set based on the motion vector predictor candidates described above. The center of the search range 1226 may be determined based on the motion vector predictor candidates, and an area included in a predetermined pixel range may be set as the search range 1226 from the determined center of the search range. Since there may be a plurality of motion vector predictor candidates, a plurality of search ranges 1226 may be set, and the search ranges 1226 may be set in different pictures.

The corresponding pixels 1224 having the smallest SAD are determined by searching the plurality of search ranges 1226, and mv_template is generated based on the determination. Sizes and shapes of the pixels 1222 adjacent to the current block 1200 may vary. Thus, this will now be described in detail with reference to FIG. 12C.

Figure 12C:
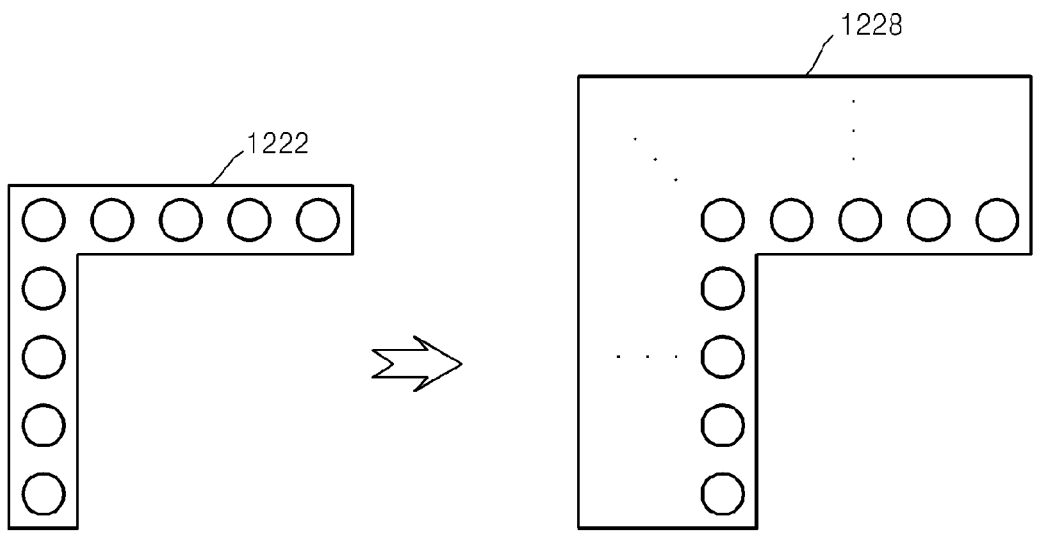
FIGS. 12C and 12D illustrate templates used to generate motion vector predictors, according to an exemplary embodiment.

FIG. 12C illustrates a template used to generate motion vector predictors, according to an exemplary embodiment.

Referring to FIG. 12C, the pixels 1222 adjacent to the current block 1200 that are used to generate the motion vector predictor of the current block 1200 by using the prediction unit 910, as illustrated in FIG. 12A, may have different sizes and shapes.

For example, when the size of the current block 1200 is 4×4, the pixels 1222 adjacent to the current block 1220 may be set to include only nine pixels, as illustrated in FIG. 12C, and pixels 1228 adjacent to the current block 1220 may be set to include nine or more pixels. In addition, the pixels 1222 may be set to have a shape other than the shape '⌈', as illustrated in FIGS. 12A through 12C.

Figure 12D:
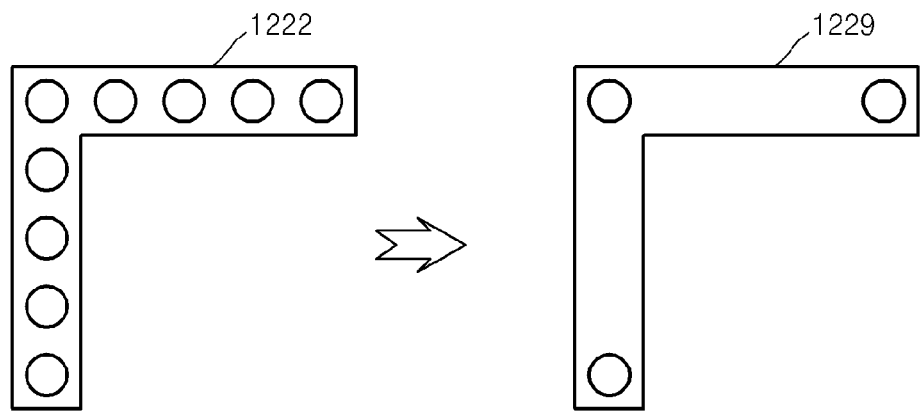

FIG. 12D illustrates a template used to generate motion vector predictors, according to another exemplary embodiment.

In the calculation of an SAD, not all of the pixels adjacent to the current block 1200 are used, and only some of the pixels 1222 adjacent to the current block 1200 may be used. For example, an SAD may be calculated using only three, five or seven pixels from among the nine pixels 1222 having the size of 4×4 adjacent to the current block 1200. FIG. 12D illustrates a template for calculating an SAD by using only a pixel adjacent to the upper-left side of the current block, a pixel in the rightmost side among pixels adjacent to the upper side thereof, and a pixel in the lower-most side among pixels adjacent to the left-side thereof.

Information about different sizes and shapes of the templates described above with reference to FIGS. 12B through 12D may be encoded separately from a motion vector, may be encoded as slice parameters and inserted into a slice header, or may be encoded as sequence parameters and inserted into a bitstream.

If a mode of using a median of motion vectors of adjacent blocks as a motion vector predictor is defined as 'implicit mode_1', and if a mode of generating a motion vector predictor using pixels adjacent to a current block is defined as 'implicit mode_2', a motion vector predictor can be generated using one of the two implicit modes implicit mode_1 and implicit mode_2 by encoding information about one of the two implicit modes in an image encoding process and referring to the information about a mode in an image decoding process.

(3) Mode Selection

There may be various criteria for the prediction unit 910 to select one of the above-described explicit mode and implicit mode.

Since one of a plurality of motion vector predictor candidates is selected in the explicit mode, a motion vector predictor more similar to a motion vector of a current block can be selected. Instead, since information indicating one of a plurality of motion vector predictor candidates is encoded, a greater overhead than in the implicit modes may occur. Thus, for a coding unit having a large size, it is proper to encode a motion vector in the explicit mode because a probability of increasing an error occurring when a motion vector is wrongly predicted is higher for a coding unit having a large size than a coding unit having a small size and when the size of a coding unit is large the frequency of overhead occurrence decreases for each picture.

For example, when a picture equally divided into m coding units having the size of 64×64 is encoded in the explicit mode, the number of overhead occurrence times is m. However, when a picture, which has the same size, equally divided into 4 m coding units having the size of 32×32 is encoded in the explicit mode, the number of overhead occurrence times is 4 m.

Accordingly, the prediction unit 910 according to an exemplary embodiment can select one of the explicit mode and the implicit mode based on the size of a coding unit when a motion vector of a current block is encoded.

Since the size of a coding unit in the image encoding method and the image decoding method according to exemplary embodiments described above in association with FIGS. 1 to 8 is represented using a depth, the predictor 910 selects, based on a depth of a current block, whether a motion vector of the current block is encoded in the explicit mode or the implicit mode. For example, when coding units whose depths are 0 and 1 are inter-predicted, motion vectors of the coding units are encoded in the explicit mode, and when coding units whose depths are equal to or greater than 2 are inter-predicted, motion vectors of the coding units are encoded in the implicit mode.

According to another exemplary embodiment, the prediction unit 910 can select the explicit mode or the implicit mode for each picture or slice unit. Since image characteristics are different for each picture or slice unit, the explicit mode or the implicit mode can be selected for each picture or slice unit by considering these image characteristics. Motion vectors of coding units included in a current picture or slice can be prediction-encoded by selecting an optimal mode from among the explicit mode and the implicit mode in consideration of R-D cost.

For example, if motion vectors of coding units included in a picture or slice can be exactly predicted without using the explicit mode, motion vectors of all coding units included in the picture or slice can be prediction-encoded in the implicit mode.

According to another exemplary embodiment, the prediction unit 910 may select the explicit mode or the implicit mode based on whether a current block has been encoded in the skip mode. The skip mode is an encoding mode in which only flag information indicating that a current block has been encoded in the skip mode is encoded without encoding a pixel value.

The skip mode is a mode in which a pixel value of a current block is not encoded if a prediction block generated by performing motion compensation using a motion vector predictor as a motion vector of the current block is similar to the current block. Thus, as a motion vector predictor is generated more similarly to a motion vector of a current block, a probability of encoding the current block in the skip mode is higher. Accordingly, a block encoded in the skip mode can be encoded in the explicit mode.

Referring back to FIG. 9, when the prediction unit 910 selects one of the explicit mode and the implicit mode and determines a motion vector predictor according to the selected mode, the first encoder 920 and the second encoder 930 encode information about an encoding mode and a motion vector.

The first encoder 920 encodes information about a motion vector predictor of a current block. In more detail, when the prediction unit 910 selects that a motion vector of the current block is encoded in the explicit mode, the first encoder 920 encodes information indicating that a motion vector predictor has been generated in the explicit mode and information indicating which motion vector predictor candidate has been used as the motion vector predictor of the current block.

In addition, if a plurality of motion vector predictor candidates include mv_temporal described above with reference to FIGS. 11A through 11C, information indicating whether a block 1200 or 1300 in a position co-located with the current block, which is a base for generating mv_temporal, is a block of a temporally preceding picture or a block of a temporally following picture, is also encoded.

On the contrary, when the prediction unit 910 selects that the motion vector of the current block is encoded in the implicit mode, the first encoder 920 encodes information indicating that the motion vector predictor of the current block has been generated in the implicit mode. In other words, the first encoder 920 encodes information indicating the motion vector predictor of the current block has been generated using blocks or pixels adjacent to the current block. If two or more implicit modes are used, the first encoder 920 may further encode information indicating which implicit mode has been used to generate the motion vector predictor of the current block.

The implicit mode may be a mode in which a motion vector predictor of a current block is generated by setting a search range based on motion vector predictor candidates of the current block and by searching within a search range set based on pixels of a previously encoded area adjacent to the current block, as illustrated in FIG. 12C.

The second encoder 930 encodes a motion vector of a current block based on a motion vector predictor determined by the prediction unit 910. Alternatively, the second encoder 930 generates a difference vector by subtracting the motion vector predictor generated by the prediction unit 910 from the motion vector of the current block generated as a result of motion compensation and encodes information about the difference vector.

Figure 13:
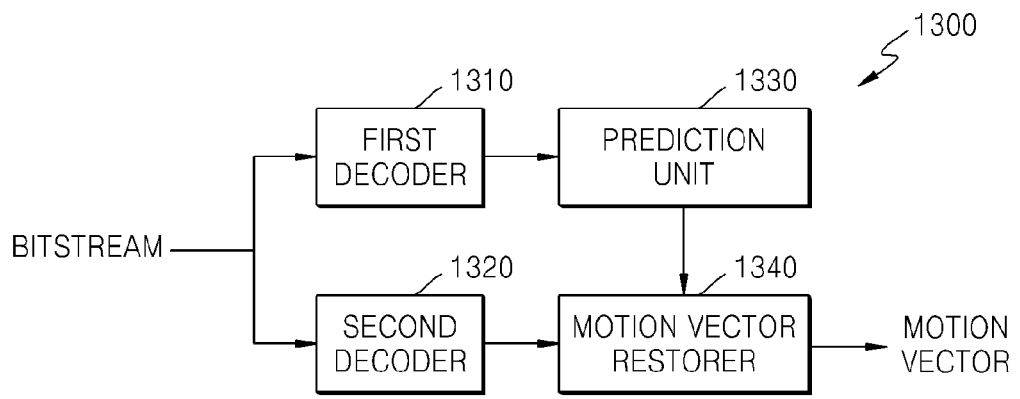
FIG. 13 is a block diagram of an apparatus for decoding a motion vector, according to an exemplary embodiment.

FIG. 13 is a block diagram of an apparatus 1300 for decoding a motion vector, according to an exemplary embodiment.

An apparatus 1300 for decoding a motion vector, which may be included in the image decoding apparatus 200 described above in association with FIG. 2 or the image decoder 500 described above in association with FIG. 5, will now be described in detail. Referring to FIG. 13, a motion vector decoding apparatus 1300 includes a first decoder 1310, a second decoder 1320, a prediction unit 1330, and a motion vector restorer 1340.

The first decoder 1310 decodes information about a motion vector predictor of a current block, which is included in a bitstream. In detail, the first decoder 1310 decodes information indicating whether the motion vector predictor of the current block has been encoded in the explicit mode or the implicit mode.

When the motion vector predictor of the current block has been encoded in the explicit mode, the first decoder 1310 further decodes information indicating one motion vector predictor used as the motion vector predictor of the current block among a plurality of motion vector predictors.

In addition, if a plurality of motion vector predictor candidates include mv_temporal described above with reference to FIGS. 11A through 11C, information indicating whether a block 1200 or 1300 in a position co-located with the current block, which is a base for generating mv_temporal, is a block of a temporally preceding picture or a block of a temporally following picture, is also decoded.

When the motion vector predictor of the current block has been encoded in the implicit mode, the first decoder 1310 may further decode information indicating which one of a plurality of implicit modes has been used to encode the motion vector predictor of the current block.

The implicit mode may be a mode in which a motion vector predictor of a current block is generated by setting a search range based on motion vector predictor candidates of the current block and by searching within a search range set based on pixels of a previously encoded area adjacent to the current block, as illustrated in FIG. 12C.

The second decoder 1320 decodes a difference vector between a motion vector and the motion vector predictor of the current block included in the bitstream.

The prediction unit 1330 generates a motion vector predictor of the current block based on the information about the motion vector predictor of the current block, which has been decoded by the first decoder 1310.

When the information about the motion vector predictor of the current block, which has been encoded in the explicit mode, is decoded, the prediction unit 1330 generates one motion vector predictor among the motion vector predictor candidates described above in association with FIGS. 10A, 10B, and 11A to 11C and uses it as the motion vector predictor of the current block.

When the information about the motion vector predictor of the current block, which has been encoded in the implicit mode, is decoded, the prediction unit 1330 generates the motion vector predictor of the current block using blocks or pixels included in a previously encoded area adjacent to the current block. In more detail, the prediction unit 1330 generates a median value of motion vectors of blocks adjacent to the current block as the motion vector predictor of the current block or generates the motion vector predictor of the current block by searching a reference picture using pixels adjacent to the current block.

The motion vector restorer 1340 restores a motion vector of the current block by summing the motion vector predictor generated by the prediction unit 1330 and the difference vector decoded by the second decoder 1320. The restored motion vector is used for motion compensation of the current block.

Figure 14:
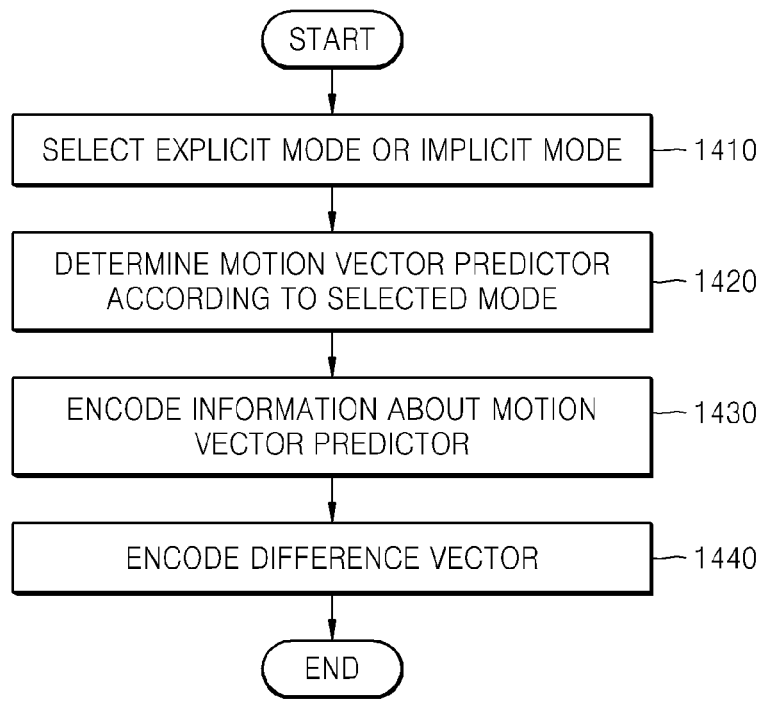
FIG. 14 is a flowchart of a method of encoding a motion vector, according to an exemplary embodiment.

FIG. 14 is a flowchart of a method of encoding a motion vector, according to an exemplary embodiment.

Referring to FIG. 14, a motion vector encoding apparatus according to an exemplary embodiment selects one of the explicit mode and the implicit mode as a mode of encoding information about a motion vector predictor in operation 1410.

The explicit mode is a mode of encoding information indicating one motion vector predictor candidate among at least one motion vector predictor candidate as information about a motion vector predictor, and the implicit mode is a mode of encoding information indicating that a motion vector predictor has been generated based on blocks or pixels included in a previously encoded area adjacent to a current block as information about the motion vector predictor. Detailed descriptions thereof have been given above in association with FIGS. 10A to 10E, 11A to 11C, and 12A to 12C.

A mode can be selected based on the size of a current block, i.e., a depth of the current block, or selected in a unit of a current picture or slice in which the current block is included. Alternatively, a mode can be selected according to whether the current block has been encoded in the skip mode.

In operation 1420, the motion vector encoding apparatus determines a motion vector predictor according to the mode selected in operation 1410. In detail, the motion vector encoding apparatus determines a motion vector predictor of the current block based on the explicit mode or implicit mode selected in operation 1410. In more detail, the motion vector encoding apparatus determines one motion vector predictor candidate among at least one motion vector predictor candidate as the motion vector predictor of the current block in the explicit mode or determines the motion vector predictor of the current block based on blocks or pixels adjacent to the current block in the implicit mode.

In operation 1430, the motion vector encoding apparatus encodes information about the motion vector predictor determined in operation 1420.

In the case of the explicit mode, the motion vector encoding apparatus encodes information indicating one motion vector predictor candidate among at least one motion vector predictor candidate and information indicating that information about the motion vector predictor of the current block has been encoded in the explicit mode.

In addition, if a plurality of motion vector predictor candidates include mv_temporal described above with reference to FIGS. 11A through 11C, information indicating whether a block 1200 or 1300 in a position co-located with the current block, which is a base for generating mv_temporal, is a block of a temporally preceding picture or a block of a temporally following picture, is also encoded.

In the case of the implicit mode, the motion vector encoding apparatus encodes information indicating that the motion vector predictor of the current block has been generated based on blocks or pixels included in a previously encoded area adjacent to the current block. In the case of a plurality of implicit modes, the motion vector encoding apparatus may further encode information indicating one of the plurality of implicit modes.

The implicit mode may be a mode in which a motion vector predictor of a current block is generated by setting a search range based on motion vector predictor candidates of the current block and by searching within a search range set based on pixels of a previously encoded area adjacent to the current block, as illustrated in FIG. 12C.

In operation 1440, the motion vector encoding apparatus encodes a difference vector generated by subtracting the motion vector predictor determined in operation 1420 from a motion vector of the current block.

Figure 15:
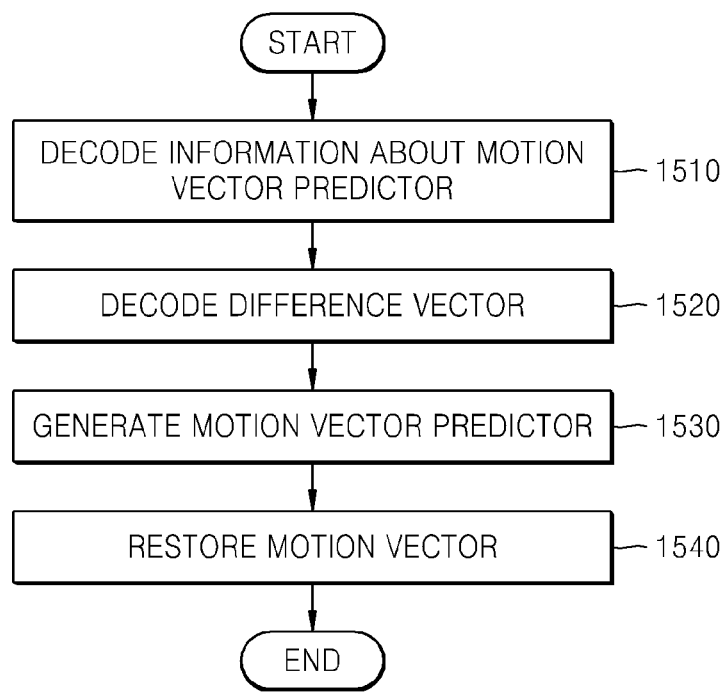
FIG. 15 is a flowchart of a method of decoding a motion vector, according to an exemplary embodiment.

FIG. 15 is a flowchart of a method of decoding a motion vector, according to an exemplary embodiment.

Referring to FIG. 15, a motion vector decoding apparatus according to an exemplary embodiment decodes information about a motion vector predictor of a current block, which is included in a bitstream, in operation 1510. In detail, the motion vector decoding apparatus decodes information about a mode used to encode the motion vector predictor of the current block among the explicit mode or the implicit mode.

In the case of the explicit mode, the motion vector decoding apparatus decodes information indicating that the motion vector predictor of the current block has been encoded in the explicit mode and information about one motion vector predictor candidate among at least one motion vector predictor candidate.

In addition, if a plurality of motion vector predictor candidates include mv_temporal described above with reference to FIGS. 11A through 11C, information indicating whether a block 1200 or 1300 in a position co-located with the current block, which is a base for generating mv_temporal, is a block of a temporally preceding picture or a block of a temporally following picture, is also decoded.

In the case of the implicit mode, the motion vector decoding apparatus decodes information indicating that the motion vector predictor of the current block has been generated based on blocks or pixels included in a previously decoded area adjacent to the current block. In the case of a plurality of implicit modes, the motion vector decoding apparatus may further decode information indicating one of the plurality of implicit modes.

The implicit mode may be a mode in which a motion vector predictor of a current block is generated by setting a search range based on motion vector predictor candidates of the current block and by searching within a search range set based on pixels of a previously encoded area adjacent to the current block, as illustrated in FIG. 12C.

In operation 1520, the motion vector decoding apparatus decodes information about a difference vector. The difference vector is a vector of a difference between the motion vector predictor of the current block and a motion vector of the current block.

In operation 1530, the motion vector decoding apparatus generates the motion vector predictor of the current block based on the information about the motion vector predictor, which has been decoded in operation 1510. In detail, the motion vector decoding apparatus generates the motion vector predictor of the current block according to the explicit mode or the implicit mode. In more detail, the motion vector decoding apparatus generates the motion vector predictor of the current block by selecting one motion vector predictor candidate among at least one motion vector predictor candidate or using blocks or pixels included in a previously decoded area adjacent to the current block.

In operation 1540, the motion vector decoding apparatus restores the motion vector of the current block by summing the difference vector decoded in operation 1520 and the motion vector predictor generated in operation 1530.

As described above, according to exemplary embodiments, a motion vector may be more accurately predicted by using both a mode in which information about a motion vector is not separately encoded and a mode in which information about a motion vector predictor is encoded.

While exemplary embodiments have been particularly shown and described above, it will be understood by one of ordinary skill in the art that various changes in form and details may be made therein without departing from the spirit and scope of the inventive concept as defined by the following claims and their equivalents. Also, an exemplary embodiment can be embodied as computer readable codes on a computer readable recording medium.

For example, the image encoding or decoding apparatus, the image encoder or decoder, the apparatus for encoding a motion vector and the apparatus for decoding a motion vector illustrated in FIGS. 1, 2, 4, 5, 9, and 13 may include a bus coupled to every unit of the apparatus or encoder, at least one processor that is connected to the bus and is for executing commands, and memory connected to the bus to store the commands, received messages, and generated messages.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

What is claimed is:

1. An apparatus for decoding an image, the apparatus comprising:
   a coding information extractor which obtains prediction mode of a current block from a bitstream;
   an image data decoder which obtains spatial motion vector predictor candidates using a neighboring block adjacent to the current block and a temporal motion vector predictor candidate of the current block using a block co-located with the current block in a temporal reference picture in direction List0 or List1 when the prediction mode of the current block is inter-prediction, obtains a motion vector predictor of the current block among the obtained motion vector predictor candidates based on information indicating a motion vector predictor used for the current block, and obtains a motion vector of the current block based on the obtained motion vector predictor and a differential vector obtained from the bitstream,
   wherein the neighboring block adjacent to the current block includes a block located on a lower-left side of the current block,
   wherein the image data decoder scales a motion vector of the block co-located with the current block in the temporal reference picture based on a first temporal distance and a second temporal distance, the first temporal distance indicates a temporal distance between a reference picture referred to by the block co-located with the current block in the temporal reference picture and the temporal reference picture, and the second temporal distance indicates a temporal distance between a current picture and a reference picture referred to by the current block,
   wherein the image is split into a plurality of maximum coding units according to an information about the maximum size of the coding unit,
   a maximum coding unit, among the plurality of maximum coding units, is hierarchically split into one or more coding units of depths including at least one of a current depth and a lower depth, and
   a current coding unit of the current depth is one of rectangular data units split from a coding unit of an upper depth.

* * * * *